(12) United States Patent
Yamamoto

(10) Patent No.: US 9,367,256 B2
(45) Date of Patent: Jun. 14, 2016

(54) STORAGE SYSTEM HAVING DEFRAGMENTATION PROCESSING FUNCTION

(71) Applicant: NEC Corporation, Minato-ku, Tokyo (JP)

(72) Inventor: Hiroaki Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 87 days.

(21) Appl. No.: 14/177,783

(22) Filed: Feb. 11, 2014

(65) Prior Publication Data

US 2014/0250282 A1    Sep. 4, 2014

(30) Foreign Application Priority Data

Mar. 1, 2013   (JP) .................. 2013-040842

(51) Int. Cl.
*G06F 3/06* (2006.01)
(52) U.S. Cl.
CPC ............ *G06F 3/0641* (2013.01); *G06F 3/0608* (2013.01); *G06F 3/0673* (2013.01); *G06F 2206/1004* (2013.01)
(58) Field of Classification Search
CPC ..... G06F 3/0608; G06F 3/0641; G06F 3/673; G06F 2206/1004
See application file for complete search history.

(56) References Cited

U.S. PATENT DOCUMENTS

| 8,484,427 | B1 * | 7/2013 | Goldobin et al. ............. 711/162 |
| 8,560,801 | B1 * | 10/2013 | Pendharkar et al. .......... 711/170 |
| 2012/0198152 | A1 * | 8/2012 | Terry et al. .................... 711/114 |

FOREIGN PATENT DOCUMENTS

| JP | 2005-235171 A | 9/2005 |
| JP | 2010-287049 A | 12/2010 |

* cited by examiner

*Primary Examiner* — Eric Oberly

(57) ABSTRACT

A storage system according to the present invention includes: a data storage controlling part that stores data into a storage device and, when storing other data of the same data content as the data, refers to the already stored data as the other data; and a defragmentation processing part that moves and stores storage target data stored in an area set as a defragmentation range within a predetermined region of the storage device, into another region of the storage device. The data storage controlling part stores reference frequency that is frequency of referring to data as other storage target data. The defragmentation processing part, depending on the reference frequency of the data, stores the data into an area to become a defragmentation range later within another region of the storage device.

9 Claims, 22 Drawing Sheets

Fig.16

REGION MANAGEMENT TABLE — 15

| REGION NUMBER | CHARACTERISTIC | IN-USE FLAG | REGION SIZE | DEFRAGMENTATION RANGE | UNUSED RANGE | LONG-LIFE RANGE | LAST WRITING TIME |
|---|---|---|---|---|---|---|---|
| ... | | | | | | | |
| 2 | SHORT-LIFE | yes | 1000 | 0-300 | 300-700 | 700-1000 | 1348740725 |
| ... | | | | | | | |
| 5 | LONG-LIFE | - | 1000 | 0-0 | 0-600 | 600-1000 | - |
| ... | | | | | | | |

STORAGE SYSTEM HAVING DEFRAGMENTATION PROCESSING FUNCTION

INCORPORATION BY REFERENCE

This application is based upon and claims the benefit of priority from Japanese patent application No. 2013-040842, filed on Mar. 1, 2013, the disclosure of which is incorporated herein in its entirety by reference.

Technical Field

The present invention relates to a storage system, more specifically, relates to a storage system which eliminates duplicate storage of data of the same content.

Background Art

In recent years, various kinds of information are digitalized in accordance with development and spread of computers. A device for storing such digital data is, for example, a storage device such as a magnetic tape and a magnetic disk. Because data to be stored increases day by day and reaches a huge amount, a mass storage system is required. Moreover, it is required to keep reliability while reducing the cost spent for a storage device. In addition, it is also required to be capable of easily retrieving data later. As a result, a storage system is expected to be capable of automatically realizing increase of storage capacity and performance, eliminating duplicate storage to reduce storage cost, and working with high redundancy.

Under such circumstances, a content-addressable storage system has been developed in recent years as shown in Patent Document 1. In this content-addressable storage system, data is distributed and stored into a plurality of storage devices, and a storage location where the data is stored is specified by a unique content address specified depending on the content of the data. Some content-addressable storage systems divide predetermined data into a plurality of fragments and store the fragments, together with fragments to become redundant data, into a plurality of storage devices, respectively.

In the content-addressable storage system as described above, it is possible by designating a content address to retrieve data, namely, a fragment stored in a storage location specified by the content address, and restore predetermined data before division by using a plurality of fragments later.

The content address is generated based on a value generated so as to be unique depending on the content of data, for example, based on a hash value of data. Thus, in a case where there is duplicate data, it is possible to acquire data of the same content by referring to data in the same storage location. Therefore, it is unnecessary to separately store the duplicate data, and it is possible to eliminate duplicate recording and reduce the volume of data.

In particular, a storage system having a function of eliminating duplicate storage as described above divides data to be written in such as a file into a plurality of block data of predetermined volume and compresses, and then writes into storage devices. By thus eliminating duplicate storage in units of the block data obtained by dividing a file, a duplication rate is increased and the volume of data is reduced. Then, by providing the above system as a storage system performing backup, the volume of a backup is reduced and a bandwidth for replication is restricted.

On the other hand, the storage system that performs deduplication described above does not overwrite stored data. That is to say, the storage system only adds new non-duplicate data or deletes old data that is not referred to. Therefore, operation of the deduplication storage system for a long time period leads to fragmentation of a free space in storage and decrease of I/O performance. Consequently, the deduplication storage system needs regular execution of defragmentation.

[Patent Document 1] Japanese Unexamined Patent Application Publication No. JP-A 2005-235171

[Patent Document 2] Japanese Unexamined Patent Application Publication No. JP-A 2010-287049

However, since defragmentation causes I/O load in the storage system regardless of operation by the user, a problem that I/O performance during defragmentation lowers is caused. Patent Document 2 describes a technique of executing defragmentation on a block that the number of page splits exceeds a threshold in a memory. This technique has a possibility that a region where defragmentation is executed is restricted and decrease of I/O performance can be suppressed, but defragmentation is not executed in consideration of the content of data. Therefore, it is not known whether defragmentation can be efficiently executed on data subjected to deduplication stored in a deduplication storage system, and there is a need to execute defragmentation on all regions in order to overcome fragmentation after all. As a result, it is impossible to overcome decrease of I/O performance in a deduplication storage system.

SUMMARY

Accordingly, an object of the present invention is to provide a storage system capable of solving a problem of decrease of I/O performance accompanying defragmentation in a deduplication storage system.

A storage system of an exemplary embodiment of the present invention includes:

a data storage controlling part configured to store storage target data into a storage device and, when storing other storage target data of an identical data content to the storage target data already stored in the storage device into the storage device, refer to the storage target data already stored in the storage device as the other storage target data; and a defragmentation processing part configured to move and store the storage target data stored in an area set as a defragmentation range within a predetermined region of the storage device, into another region of the storage device.

The data storage controlling part is configured to, for each of the storage target data stored in the storage device, store reference frequency that is frequency of referring to the storage target data as the other storage target data.

The defragmentation processing part is configured to, depending on the reference frequency of the storage target data, store the storage target data into an area to become a defragmentation range later within another region of the storage device.

A non-transitory computer-readable medium of another exemplary embodiment of the present invention stores a program including instructions for causing an information processing device to realize:

a data storage controlling part configured to store storage target data into a storage device and, when storing other storage target data of an identical data content to the storage target data already stored in the storage device into the storage device, refer to the storage target data already stored in the storage device as the other storage target data; and a defragmentation processing part configured to move and store the storage target data stored in an area set as a defragmentation range within a predetermined region of the storage device, into another region of the storage device.

The program also includes instructions for causing an information processing device to perform operations including:

by the data storage controlling part, for each of the storage target data stored in the storage device, storing reference frequency that is frequency of referring to the storage target data as the other storage target data; and by the defragmentation processing part, depending on the reference frequency of the storage target data, storing the storage target data into an area to become a defragmentation range later within another region of the storage device.

A defragmentation method of another exemplary embodiment of the present invention includes:

performing data storage control by storing storage target data into a storage device and, when storing other storage target data of an identical data content to the storage target data already stored in the storage device into the storage device, referring to the storage target data already stored in the storage device as the other storage target data; and, for each of the storage target data stored in the storage device, storing reference frequency that is frequency of referring to the storage target data as the other storage target data;

executing a defragmentation process that is moving and storing the storage target data stored in an area set as a defragmentation range within a predetermined region of the storage device, into another region of the storage device; and in the defragmentation process, depending on the reference frequency of the storage target data, storing the storage target data into an area to become a defragmentation range later within another region of the storage device.

Configured as described above, the present invention can suppress decrease of I/O performance accompanying defragmentation in a storage system.

BRIEF DESCRIPTION OF DRAWINGS

FIG. 16 is a diagram showing an aspect of data stored in a storage system in a second exemplary embodiment of the present invention;

EXEMPLARY EMBODIMENT

<First Exemplary Embodiment>

Figure 1:
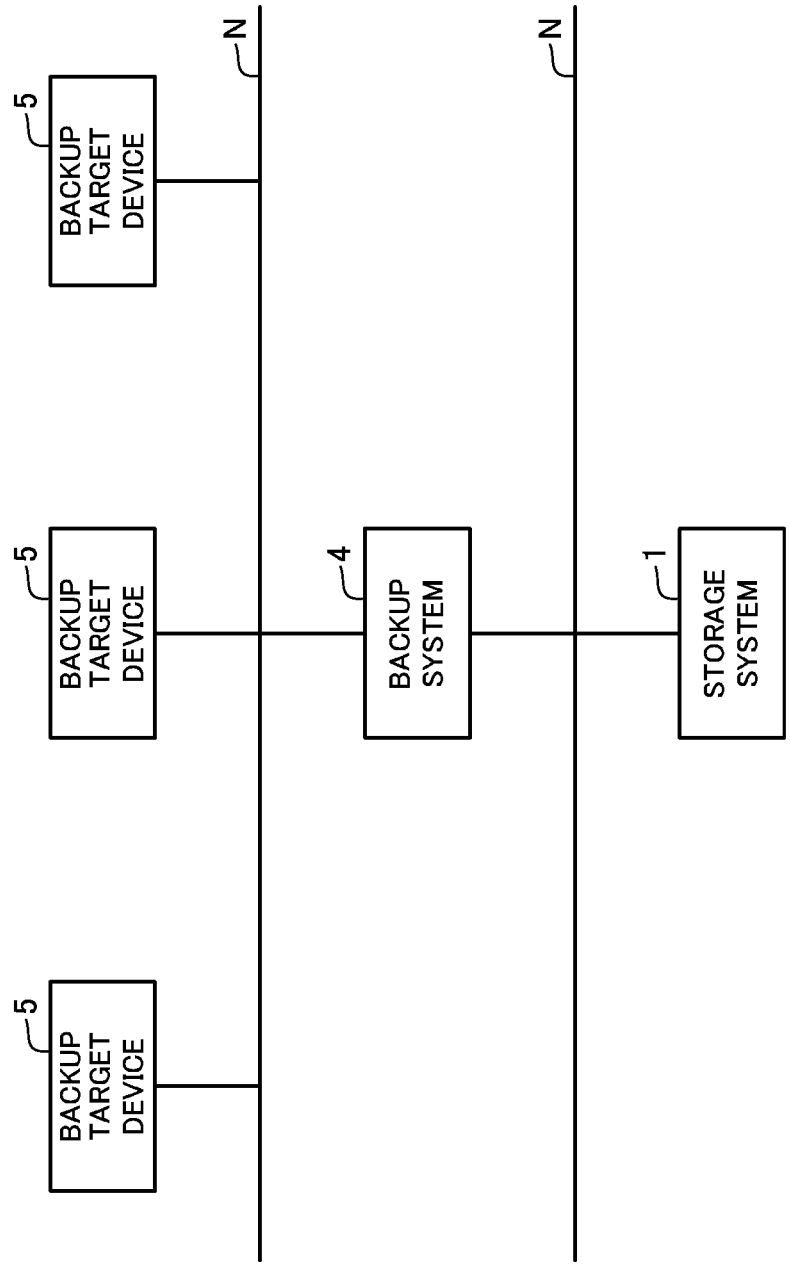
FIG. 1 is a block diagram showing a configuration of a whole system including a storage system in a first exemplary embodiment of the present invention.
Figure 2:
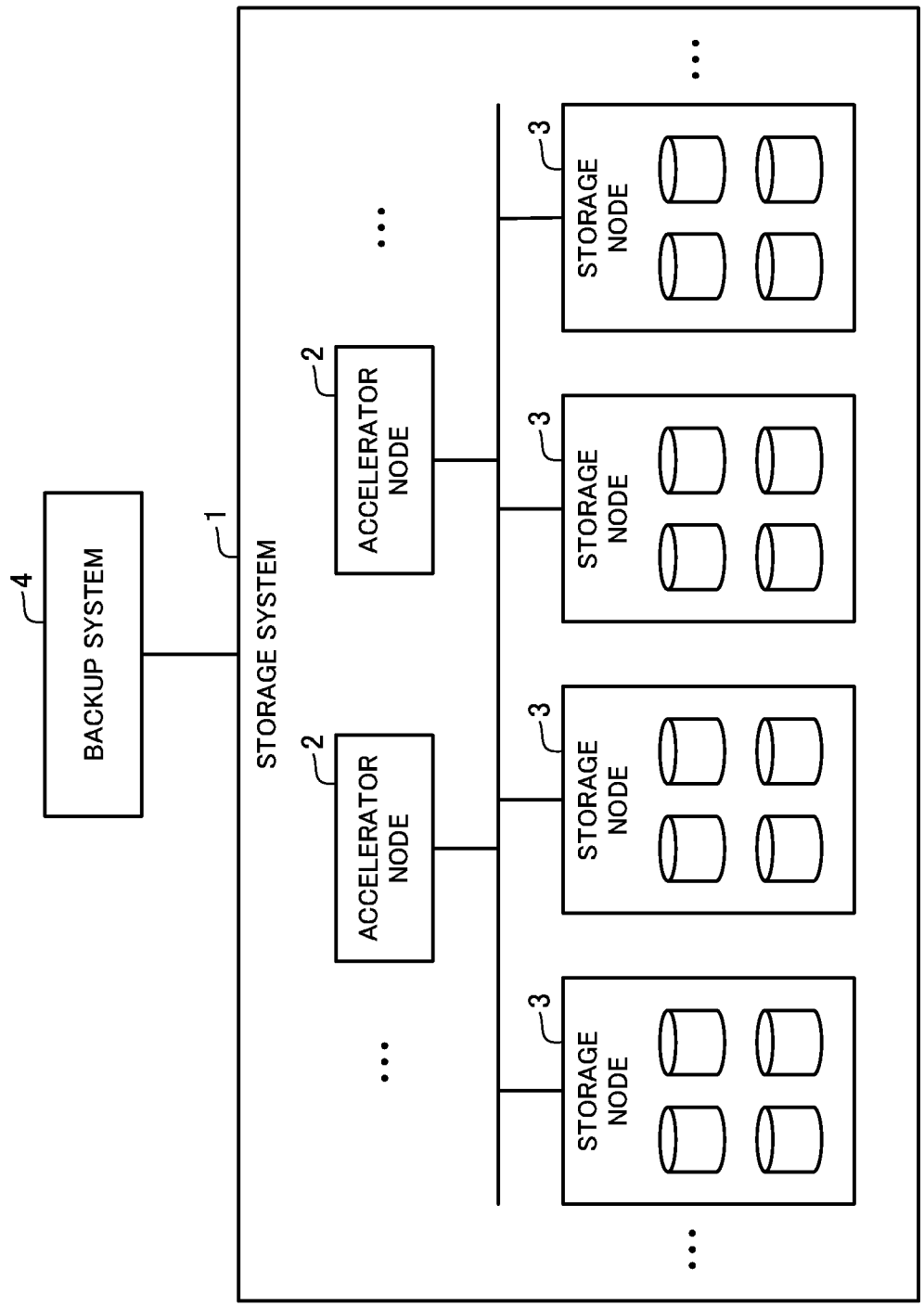
FIG. 2 is a block diagram showing the outline of a configuration of the storage system in the first exemplary embodiment of the present invention.
Figure 3:
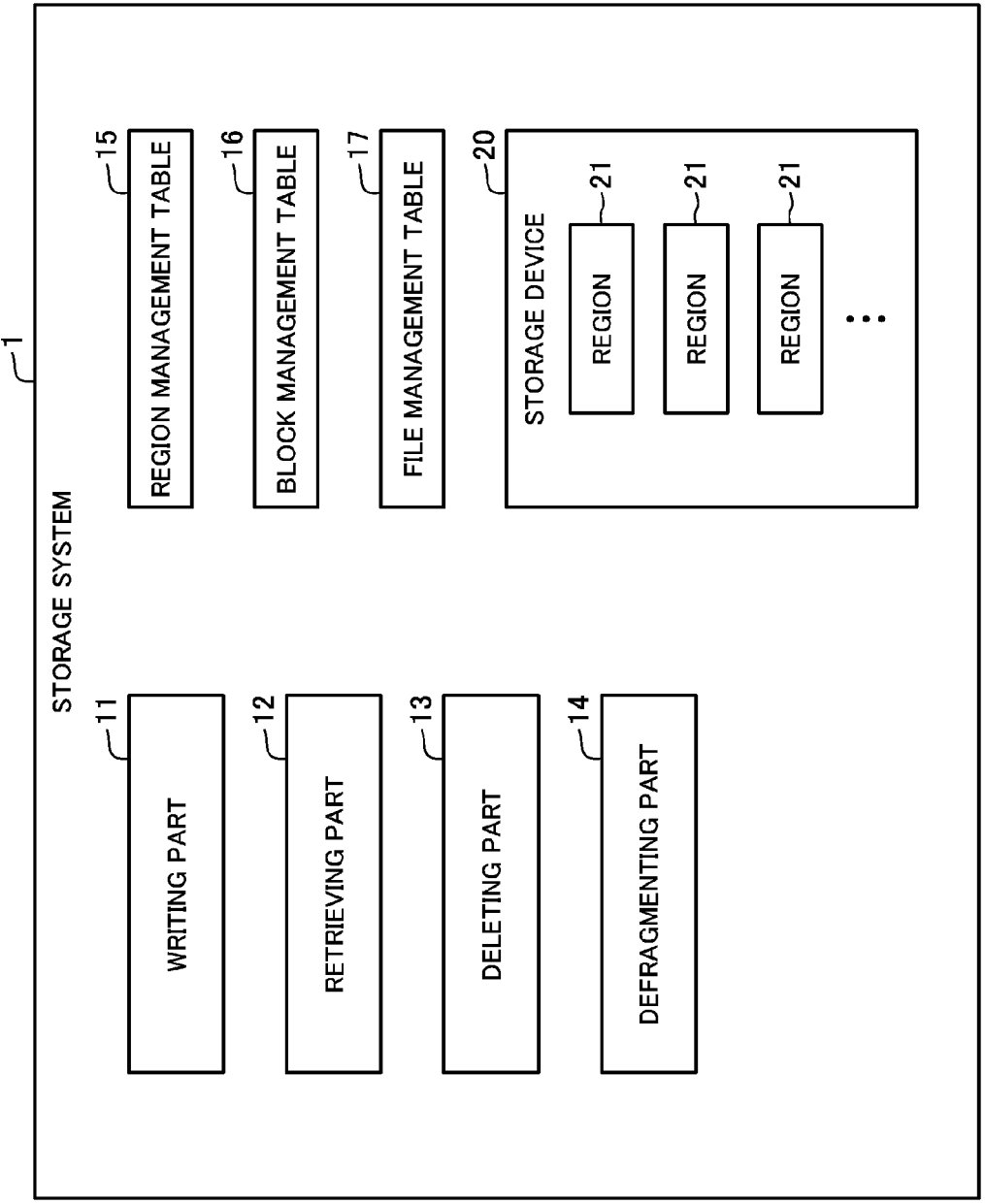
FIG. 3 is a function block diagram showing the configuration of the storage system in the first exemplary embodiment of the present invention.
Figure 13:
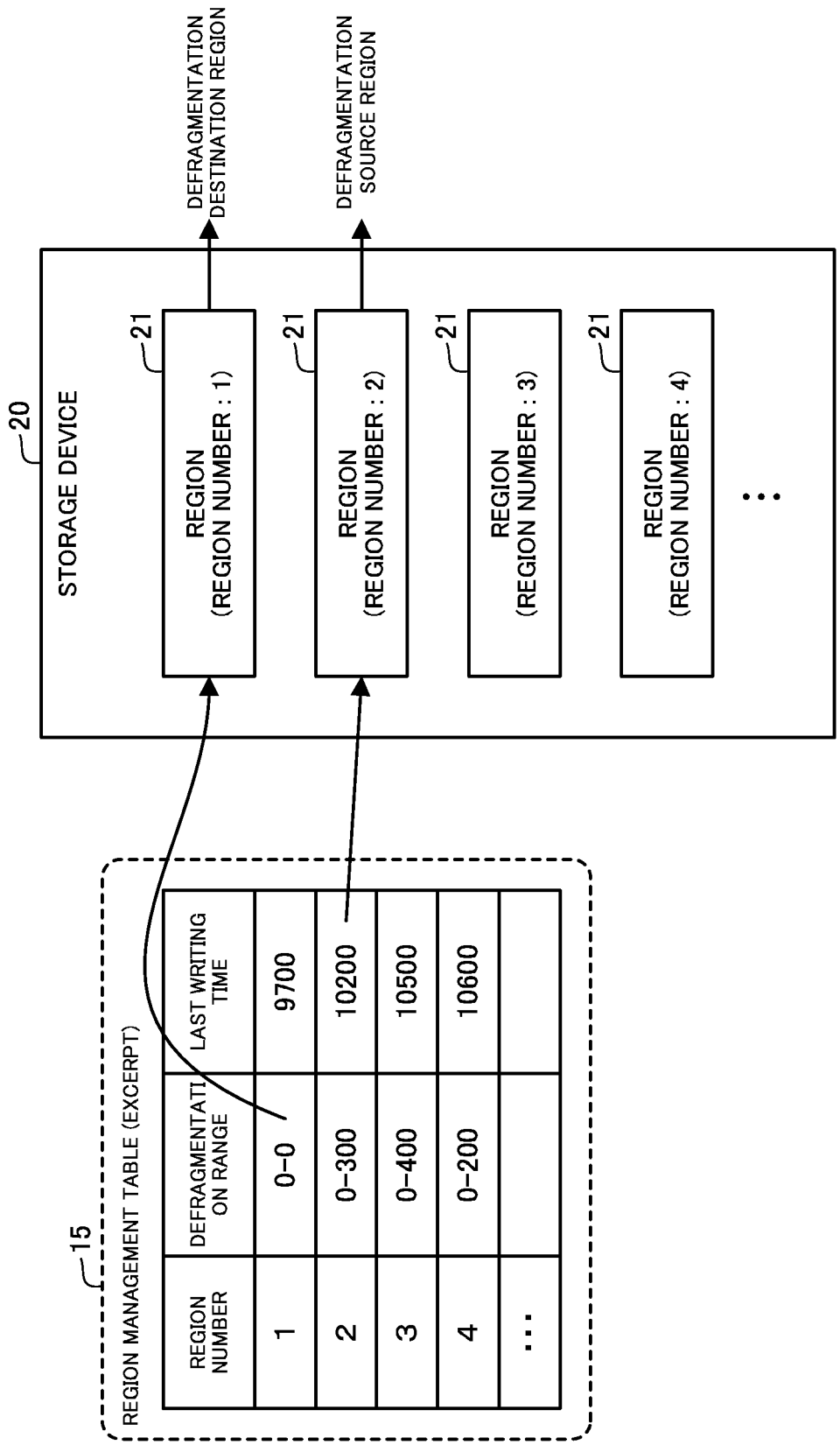
FIG. 13 is an explanation diagram for explaining the aspect of the defragmentation process in the storage system disclosed in FIG. 3.
Figure 14:
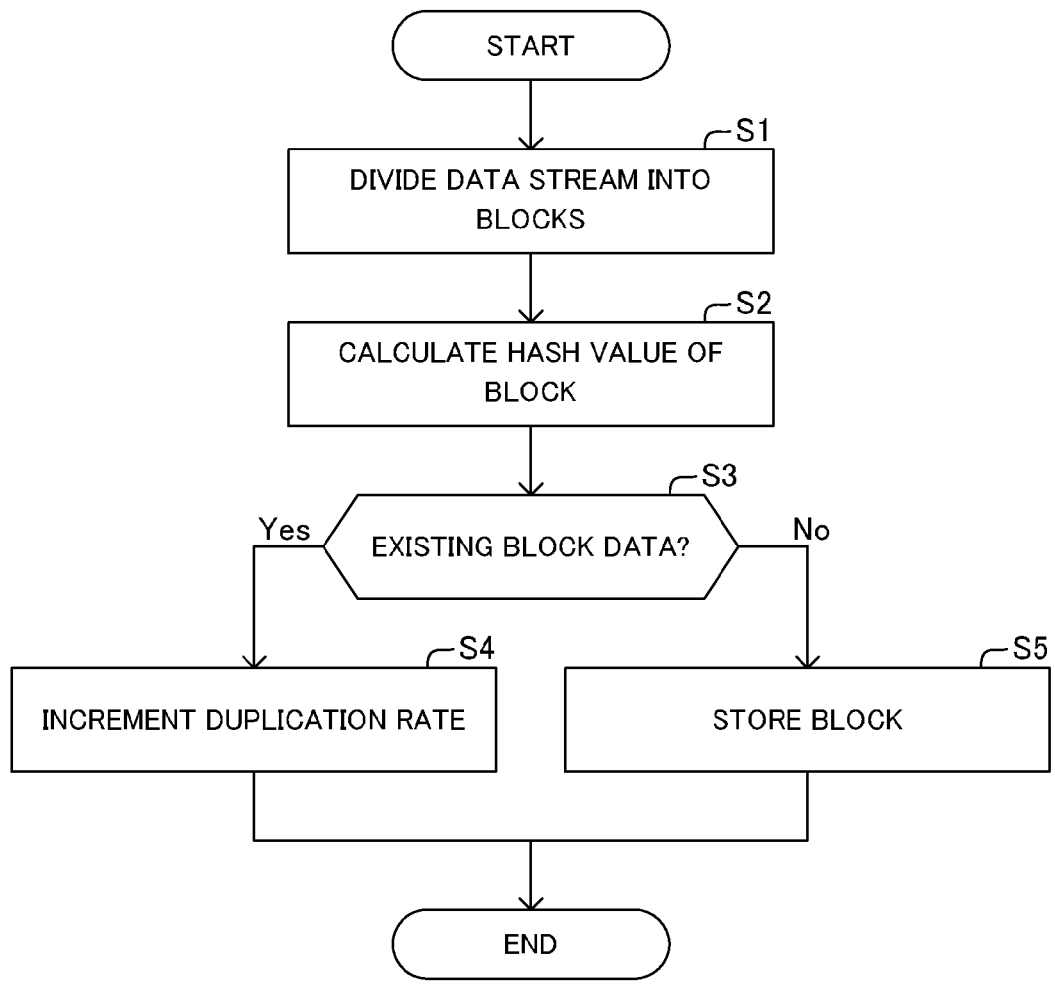
FIG. 14 is a flowchart showing an operation in the data writing process in the storage system disclosed in FIG. 3.
Figure 15:
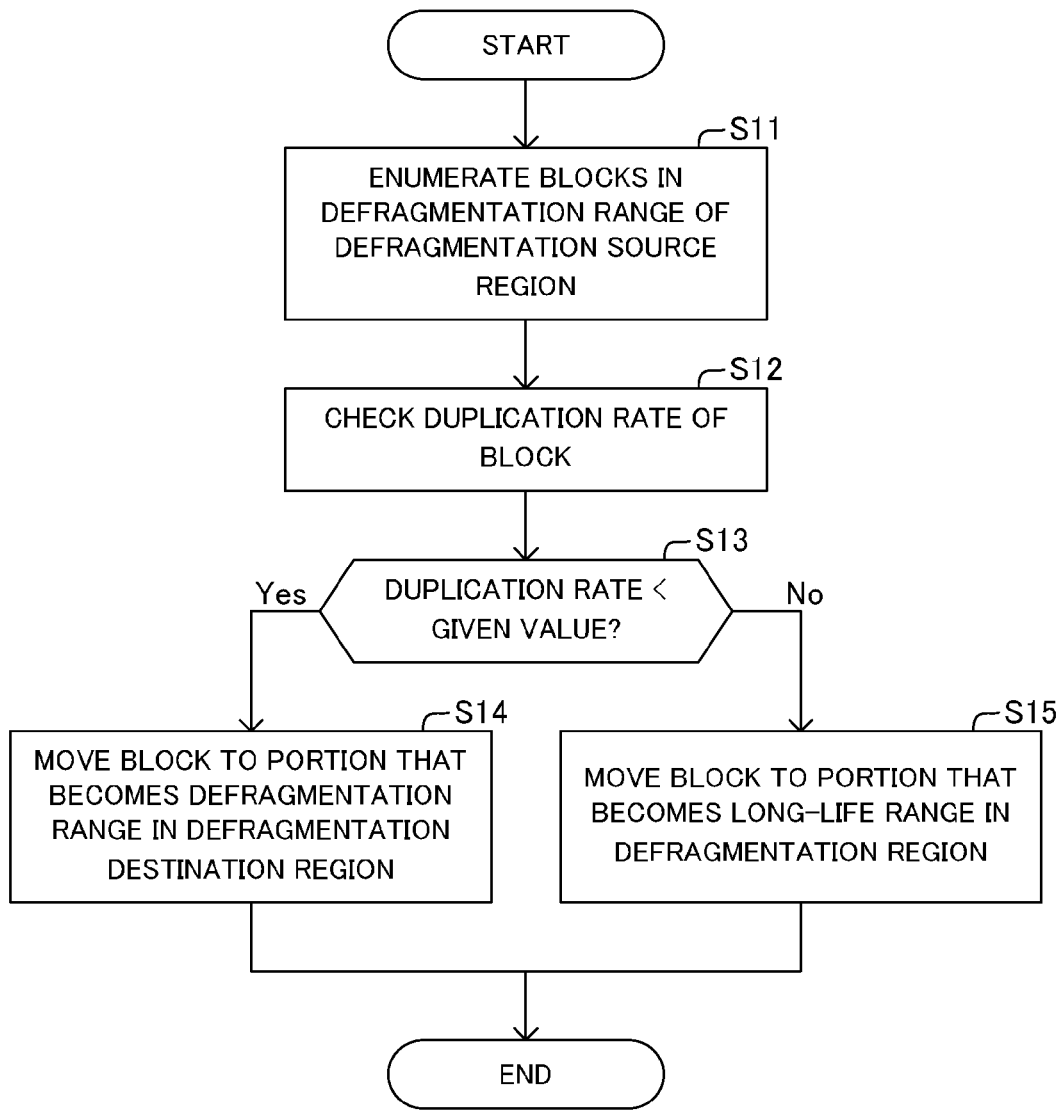
FIG. 15 is a flowchart showing an operation of the defragmentation process in the storage system disclosed in FIG. 3.

Referring to FIGS. 1 to 15, a first exemplary embodiment of the present invention will be described. FIG. 1 is a block diagram showing a configuration of a whole system. FIG. 2 is a block diagram showing the outline of a storage system, and FIG. 3 is a function block diagram showing a configuration of the storage system. FIGS. 4 to 13 are explanation diagrams for explaining an operation in a data writing process and an operation in a defragmentation process of the storage system. FIGS. 14 and 15 are flowcharts showing operations of the storage system.

This exemplary embodiment shows one specific example of a storage system and so on described in Supplementary Notes to be described later. In a case to be described below, a storage system is configured with a plurality of server computers connected. However, a storage system according to the present invention is not limited by being configured by a plurality of computers, and may be configured by one computer.

[Configuration]

As shown in FIG. 1, a storage system 1 according to the present invention is connected to a backup system 4 that controls a backup process via a network N. The backup system 4 acquires backup target data (storage target data) stored in a backup target device 5 connected via the network N, and requests the storage system 1 to store the data. Thus, the storage system 1 stores the backup target data that the storage system 1 is requested to store, for a backup.

As shown in FIG. 2, the storage system 1 in this exemplary embodiment is configured with a plurality of server computers connected. To be specific, the storage system 1 includes accelerator nodes 2 each of which is a server computer controlling a storage reproduction operation in the storage system 1 itself, and storage nodes 3 each of which is a server computer including a storage device that stores data. The number of the accelerator nodes 2 and the number of the storage nodes 3 are not limited by those in FIG. 2, and the system may be configured with more nodes 2 and more nodes 3 connected.

Further, the storage system 1 in this exemplary embodiment is a content-addressable storage system that divides data, makes the data redundant and stores the data into a plurality of storage devices in a distributed manner, and that also specifies a storage location where data is stored by using a unique content address set depending on the content of the data. This content-addressable storage system will be described later.

Assuming the storage system 1 is one system, configurations and functions of the storage system 1 will be described below. That is to say, the configurations and functions of the storage system 1 to be described below may be included by either the accelerator nodes 2 or the storage nodes 3. The storage system 1 is not limited by including the accelerator nodes 2 and the storage nods 3 necessarily as shown in FIG. 2, and may be configured in any manner. For example, the storage system 1 may be configured by one computer. Besides, the storage system 1 is not limited by being a content-addressable storage system, and can be any storage system that has a deduplication function.

FIG. 3 shows a configuration of the storage system 1 in this exemplary embodiment. As shown in this diagram, the storage system 1 is configured by a server computer, and includes an arithmetic device (not shown in the diagram) executing a predetermined arithmetic process, and a storage device 20. The storage system 1 includes a writing part 11 (a data storage controlling part), a retrieving part 12, a deleting part 13, and a defragmenting part 14 (a defragmentation processing part), which are constructed by installing a program in the arithmetic device.

Practically, the configuration of the storage system 1 described above is realized by arithmetic devices such as CPUs (Central Processing Units) and storage devices such as hard disk drives included by the respective accelerator nodes 2 and storage nodes 3 shown in FIG. 2.

As mentioned above, the storage system 1 in this exemplary embodiment is a content-addressable storage system. Therefore, the storage system 1 has a function of storing data into the storage device 20 by using a content address and, as described below, stores data by dividing and distributing data and specifying a storage location with a content address. Below, referring to FIGS. 4 and 5, an example of a data writing process by the writing part 11 using a content address and an example of a retrieving process by the retrieving part 12 using a content address in the storage system 1 will be described. However, processes to be described below are examples of the data writing process and the retrieving process in a deduplication-type storage system. Therefore, the storage system 1 according to the present invention is not limited by writing and retrieving data in the following manner, and may execute the data writing process and the retrieving process while eliminating duplicate storage by another method.

Figure 4:
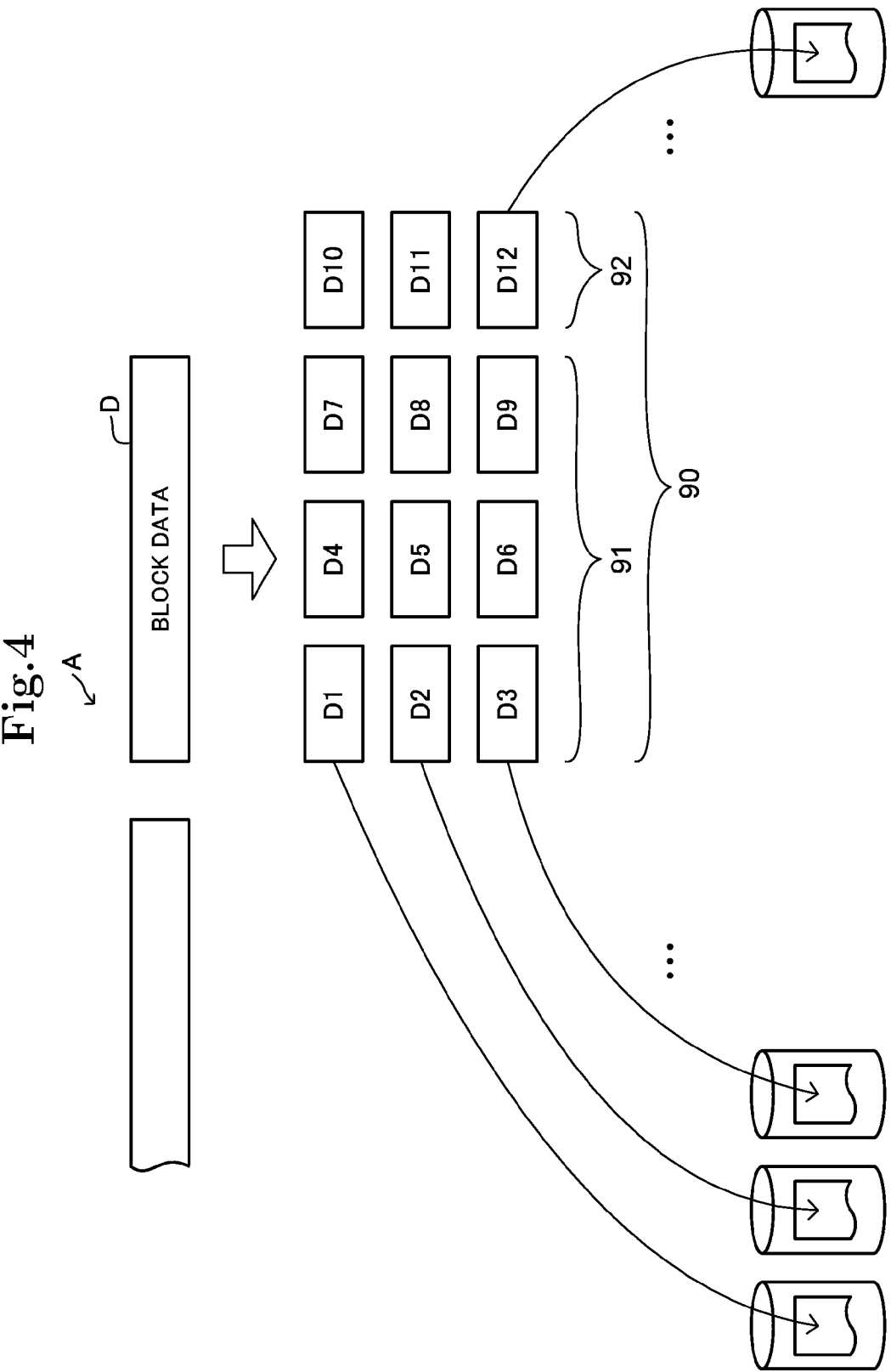
FIG. 4 is an explanation diagram for explaining an aspect of a data writing process in the storage system disclosed in FIG. 3.
Figure 5:
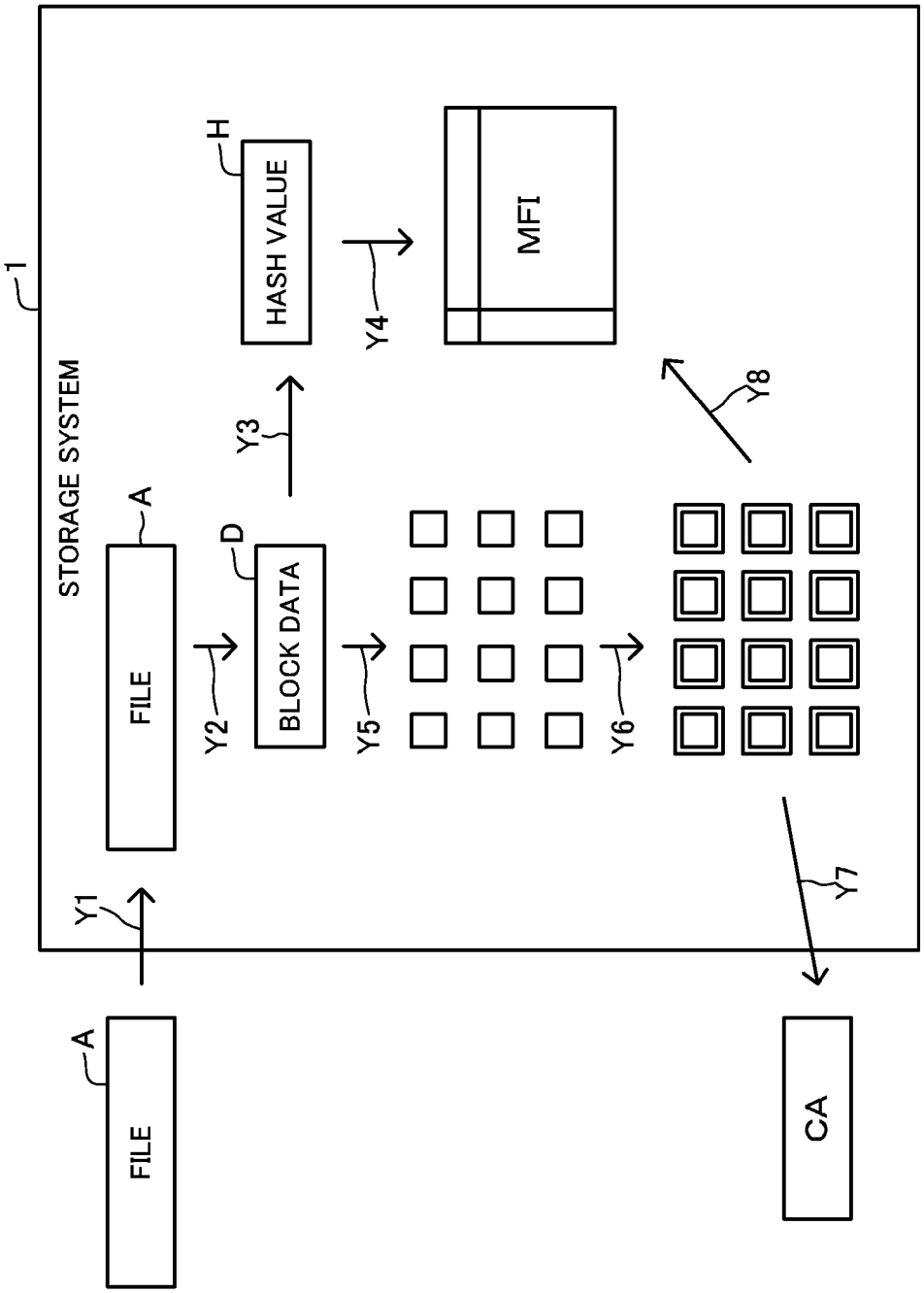
FIG. 5 is an explanation diagram for explaining the aspect of the data writing process in the storage system disclosed in FIG. 3.

First, as shown by FIG. 4 and arrow Y1 in FIG. 5, the storage system 1 receives input of a file A that the storage system 1 is requested to write in. Then, as shown by FIG. 4 and arrow Y2 in FIG. 5, the storage system 1 divides the file A into predetermined volumes (e.g., 64 KB) of block data D.

Subsequently, based on the data content of the block data D obtained by division, the storage system 1 calculates a unique hash value H representing this data content (arrow Y3 in FIG. 5). For example, the hash value H is calculated based on the data content of the block data D by using a preset hash function.

Subsequently, by using the hash value H of the block data D of the file A, the storage system 1 determines whether this block data D is already stored or not. To be specific, because hash values H of already stored block data D and content addresses CA representing storage locations of the same are associated and registered in an MFI (Main Fragment Index) file, it is possible to determine that block data D of the same content is already stored in a case where the hash value H of the block data D calculated before storage exists in the MFI file (arrow Y4 in FIG. 5). In this case, the storage system 1 acquires, from the MFI file, a content address CA associated with a hash value H registered in the MFI that agrees with the hash value H of the block data D before storage. Then, the storage system 1 returns this content address CA as a content address CA of the block data D that the storage system 1 is requested to write in.

Then, the storage system 1 uses already stored data referred to by the returned content address CA, as the block data D that the storage system 1 is requested to write in. That is to say, the storage system 1 regards designating a region referred to by the returned content address CA as a storage destination of the requested block data D, as storing this requested block data D. This eliminates the need for actually storing the requested block data D into the storage device 20.

On the other hand, in the case of determining that the block data D relating to the writing request is not stored yet, the storage system 1 writes in this block data D in the following manner. First, the storage system 1 compresses the block data D relating to the writing request and divides the data into a plurality of predetermined volumes of fragment data as shown by arrow Y5 in FIG. 5. For example, as shown by reference symbols D1 to D9 in FIG. 4, the storage system 1 divides the data into nine fragment data (divided data 91). Then, the storage system 1 generates redundant data so as to be capable of restoring the original block data even if some of the fragment data obtained by division are lost, and adds the redundant data to the fragment data 91 obtained by division. For example, as shown by reference symbols D10 to D12 in FIG. 4, the storage system 1 adds three fragment data (redundant data 92). Thus, the storage system 1 generates a data set 90 composed of twelve fragment data including the nine divided data 91 and the three redundant data 92.

Subsequently, the storage system 1 distributes and stores the fragment data composing the data set generated in the abovementioned manner into the storage regions formed in the storage devices, respectively. For example, as shown in FIG. 4, in the case of generating the twelve fragment data D1 to D12, the storage system 1 stores the fragment data D1 to D12 one by one into data storage files formed in the storage devices, respectively (see arrow Y6 in FIG. 5).

Subsequently, the storage system 1 generates and manages a content address CA representing storage locations of the fragment data D1 to D12 stored in the abovementioned manner, namely, a storage location of the block data D restored from these fragment data D1 to D12. To be specific, a content address CA is generated by combining part of a hash value H (a short hash: e.g., the beginning 8B (byte) of the hash value H) calculated based on the content of the stored block data D and information representing a logical storage location. Then, this content address CA is returned to a file system in the storage system 1 (arrow Y7 in FIG. 5). The storage system 1 associates and manages identification information such as a file name of backup target data and the content address CA in the file system.

Further, each of the storage nodes 3 associates and manages a content address CA of block data D and a hash value H of the block data D in the MFI file. Thus, a content address CA is associated with information specifying a file, a hash value H and so on, and stored into the storage devices of the accelerator nodes 2 and the storage nodes 3.

Further, the storage system 1 executes control to retrieve a file stored in the abovementioned manner. For example, upon reception of a retrieval request with a specific file designated, the storage system 1 first designates a content address CA including a short hash that is part of a hash value corresponding to the file relating to the retrieval request and information on a logical location, based on the file system. Then, the storage system 1 determines whether the content address CA is registered in the MFI file or not. If the content address CA is not registered, the requested data is not stored and hence an error is returned.

On the other hand, in a case where the content address CA relating to the retrieval request is registered, the storage system 1 specifies a storage location designated by the content address CA, and retrieves respective fragment data stored in this specified storage location, as the data relating to the retrieval request. In this instance, when data storage files storing the respective fragment data and a storage location of the fragment data in one of the data storage files are known, the storage system 1 can specify storage locations of the other fragment data as the same storage location.

Then, the storage system 1 restores block data D from the fragment data retrieved in response to the retrieval request. Moreover, the storage system 1 connects a plurality of restored block data D to restore as a group of data such as a file A, and returns.

Next, a configuration for executing defragmentation on data written in the storage device 20 as described above will be further described. As shown in FIG. 3, the storage system 1 includes a region management table 15, a block management table 16, and a file management table 17. These tables 15, 16 and 17 are formed in a main storage device that is not shown in the drawings. A storage region of the storage device 20 configured by an auxiliary storage device is divided into a plurality of regions 21 and managed.

Figure 6:
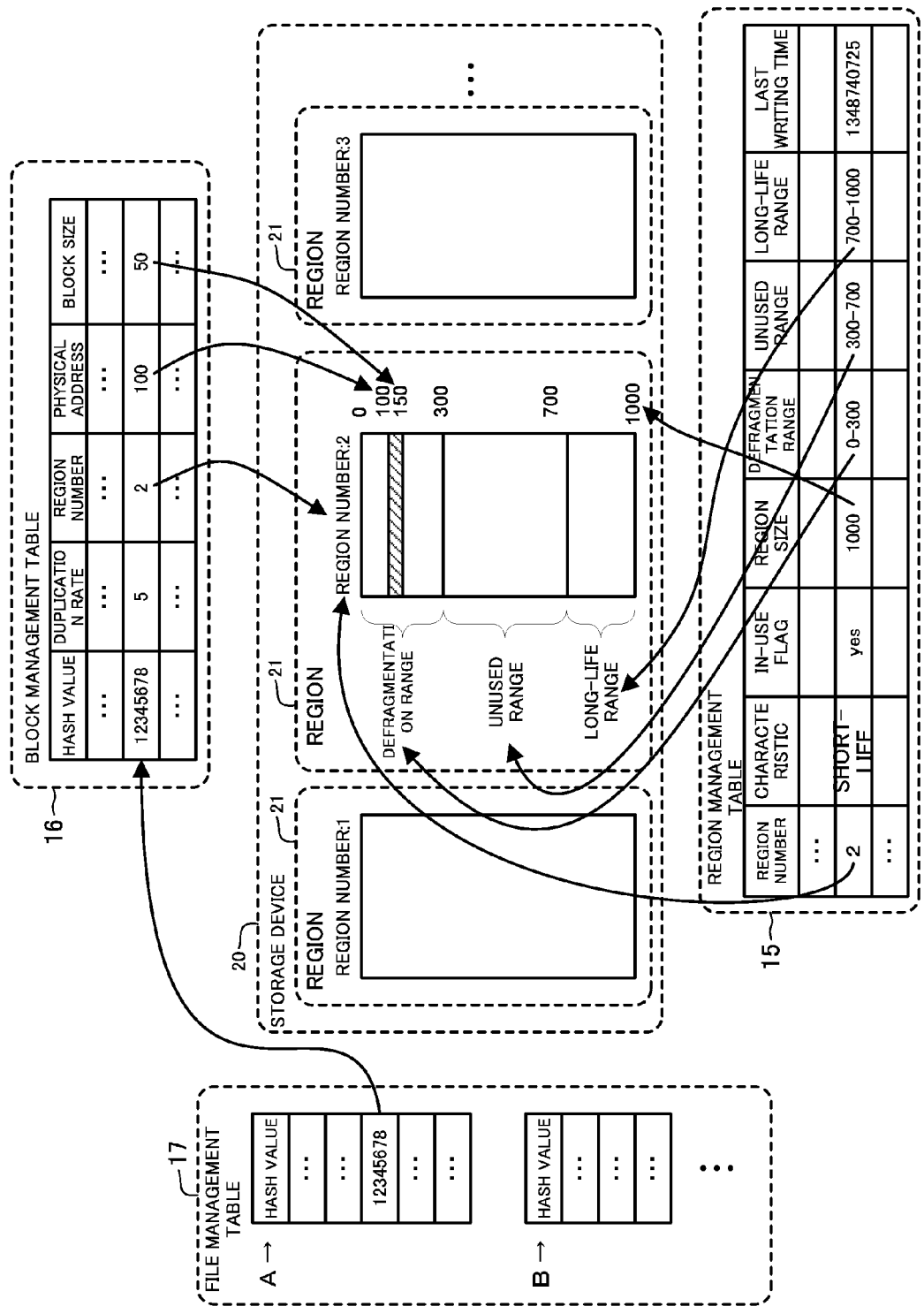
FIG. 6 is an explanation diagram for explaining a data structure in the storage system disclosed in FIG. 3.

FIG. 6 shows the details of the region management table 15, the block management table 16, and the file management table 17. FIG. 6 also shows a relation between these tables and the storage device 20 and regions 21.

A column of "region number" in the region management table 15 represents a unique number for identifying each of the regions 21. At the time of writing in, only one of the regions 21 in the storage device 20 becomes writable, and the writable region 21 is specified by switching only an "in-use flag" of the writable region 21 to "yes." "Region size" represents the total size of data that can be stored in each of the regions 21. "Defragmentation range" represents a target range when the defragmenting part 14 executes defragmentation as described later. "Unused range" represents a range in which any data is not stored and in which data is to be stored by the writing part 11 or the defragmenting part 14 as described later. "Long-life range" represents a range in which a block with high duplication rate is stored by the defragmenting part 14 as described later. "Last writing time" represents time when data is last written into the region 21.

A column of "hash value" in the block management table 16 represents a hash value of each block data obtained by dividing a file. A hash value is a value representing the data content of block data. The writing part 11 determines by using a hash value whether block data to be written in is already stored in the storage device 20 or not as mentioned above. A column of "duplication rate" represents the duplication rate of each block data. A duplication rate is a value of the frequency of referring to block data as other block data (reference frequency). "Region number," "physical address," and "block size" each indicate a physical location where block data is stored in the storage device 20.

The file management table 17 holds a list of block data configuring a file, as a list of hash values.

At the time of storing a file into the regions 21 of the storage device 20, the writing part 11 in this exemplary embodiment registers a hash value of each block data obtained by dividing the file into the file management table 17 and the block management table 16. In this instance, the writing part 11 determines based on the hash value of the block data whether this block data is already stored in the region 21 in the storage device 20 or not. In a case where the block data to be stored already exists in the storage device 20, the writing part 11 refers to the existing block data and increments the value of the duplication rate (the reference frequency) on a line of the corresponding hash value in the block management table 16.

On the other hand, in a case where the hash value of the block data to be stored is unknown, the writing part 11 refers to the region management table 15, finds the region 21 with the "in-use flag" being "yes," and writes in this block data at the beginning of the unused range of this region 21. Then, the writing part 11 decreases the unused range from the beginning thereof by the size of the block data to increase the defragmentation range from the ending thereof, and updates the last writing time of this region 21 in the region management table 15. In addition, the writing part 11 adds a new entry to the block management table 16, and stores a region number, a physical address and a block size that have been used at the time of writing. The writing part 11 finally adds the hash value of the block having been written in to the list of the corresponding file name in the file management table 17.

The retrieving part 12 refers to the file management table 17, and enumerates hash values of block data configuring a file that is a retrieval target. Then, the retrieving part 12 refers to the block management table 16, finds regions where these block data are stored, physical addresses and block sizes, and retrieves the block data from the corresponding storage locations.

The deleting part 13 decrements "duplication rate" in an entry in the block management table 16 of each of block data configuring a file to be deleted. When a duplication rate is decremented to 0, the deleting part 13 deletes the corresponding entry from the block management table 16. However, a duplication rate does not need to be instantly decremented at the time of deletion, and can also be decremented at proper timing after a file is deleted, namely, block data are deleted.

Next, the defragmenting part 14 in this exemplary embodiment will be described. The defragmenting part 14 executes, at predetermined timing, a defragmentation process of moving and storing block data stored in a defragmentation source region that is predetermined one of the regions 21 of the storage device 20 into a defragmentation destination region that is another of the regions 21. In this instance, the defragmenting part 14 sets block data in a defragmentation range of the defragmentation source region as a defragmentation target and, depending on the duplication rates of the block data, decides an area to store in the defragmentation destination region.

For example, the defragmenting part 14 stores block data with duplication rates less than a preset given value (a threshold) so that stored data are consecutive from a site adjacent to a defragmentation range in an unused range of a defragmentation destination region. Then, after storing block data or ending defragmentation, the defragmenting part 14 sets a portion where the defragmentation range and the block data stored in the unused range are consecutive in the defragmentation destination region, as a new defragmentation range, and decreases the unused range by the size of the block data.

On the other hand, the defragmenting part 14 stores block data with duplication rates equal to or higher than the preset given value (the threshold) so that stored data are consecutive from a site adjacent to a long-life range (a non-defragmentation range) in the unused range of the defragmentation destination region. Then, after storing block data or ending defragmentation, the defragmenting part 14 sets a portion where the long-life range and the block data stored in the unused range are consecutive in the defragmentation destination region, as a new long-life range, and decreases the unused range by the size of the block data.

[Operation]

Next, referring to FIGS. 7 to 15, an operation in the storage system configured as stated above will be described. First, referring to FIGS. 7 to 9 and 14, an operation of writing a file into the storage system will be described.

First, the writing part 11 divides a file (a data stream) to be written in into predetermined volumes of block data based on a fingerprint (step S1). Next, the writing part 11 calculates a hash value of each of the block data obtained by division (step S2).

After that, the writing part 11 checks the block management table 16, and determines whether block data having the corresponding hash value exists in the storage device 20 or not (step S3). In a case where such block data already exists in the storage device 20 (step S3: Yes), the writing part 11 refers to the already existing block data as the writing target block data, and increments the value of the duplication rate on a line of the hash value corresponding to the block data having been referred to in the block management table 16 (step S4).

Figure 7:
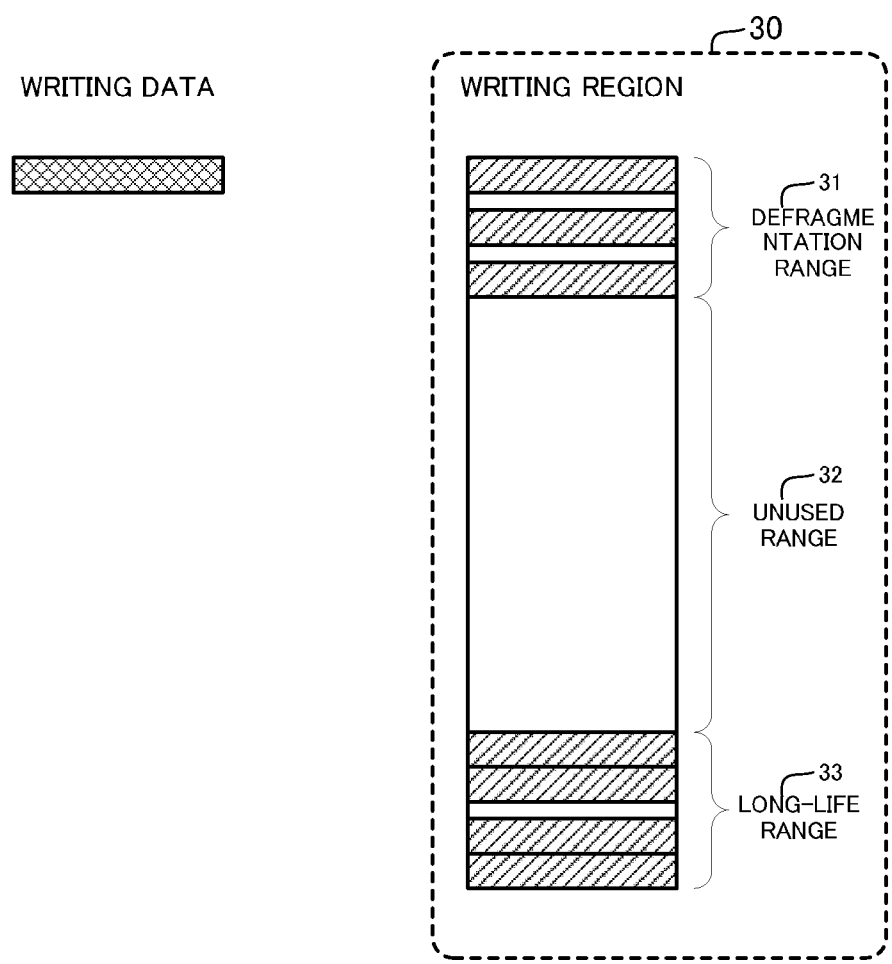
FIG. 7 is an explanation diagram for explaining the aspect of the data writing process in the storage system disclosed in FIG. 3.

On the other hand, in a case where the hash value of the writing target block data is unknown, that is, the block data is not stored in the storage device 20 (step S3: No), the writing part 11 refers to the region management table 15, and finds a region 21 with the in-use flag being "yes" (a predetermined region). Herein, it is assumed that a writing region 30 shown in FIG. 7 is found as the region. The writing region 30 is a region set so that a defragmentation range 31, an unused range 32 and a long-life range 33 having predetermined volumes, respectively, lie in this order. That is to say, the unused range 32 is sandwiched between the defragmentation range 31 and the long-life range 33, the defragmentation range 31 is adjacent to the beginning (one end) of the unused range 32, and the long-life range 33 is adjacent to the end (the other end) of the unused range 32. The long-life range 33 does not need to be set in the writing region 30 necessarily.

Figure 8:
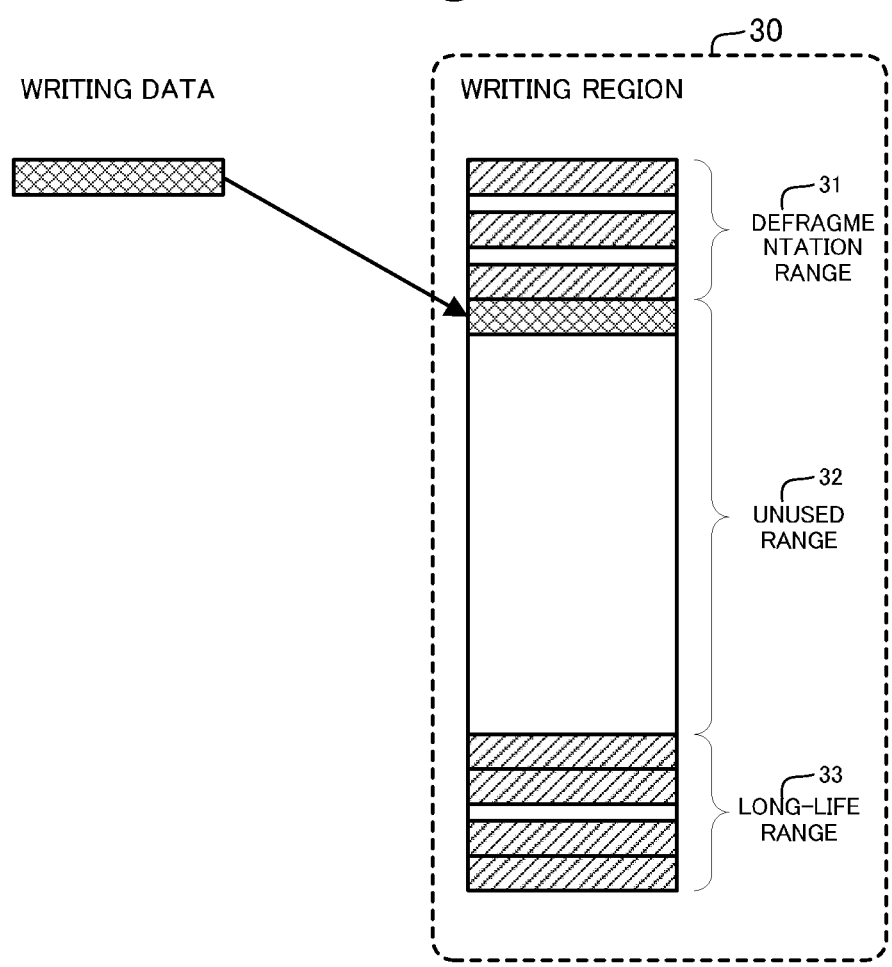
FIG. 8 is an explanation diagram for explaining the aspect of the data writing process in the storage system disclosed in FIG. 3.

Then, as shown in FIG. 8, the writing part 11 writes in the block data at the beginning of the unused range 32 of the writing region 30, namely, at a site adjacent to the defragmentation range 31 in the unused range 32 (step S5: refer to a cross-hatching portion in FIG. 8). In a case where other block data is already stored at the site adjacent to the defragmentation range 31 in the unused range 32, the writing part 11 writes in the block data at a site where data is located continuously from the defragmentation range 31.

Figure 9:
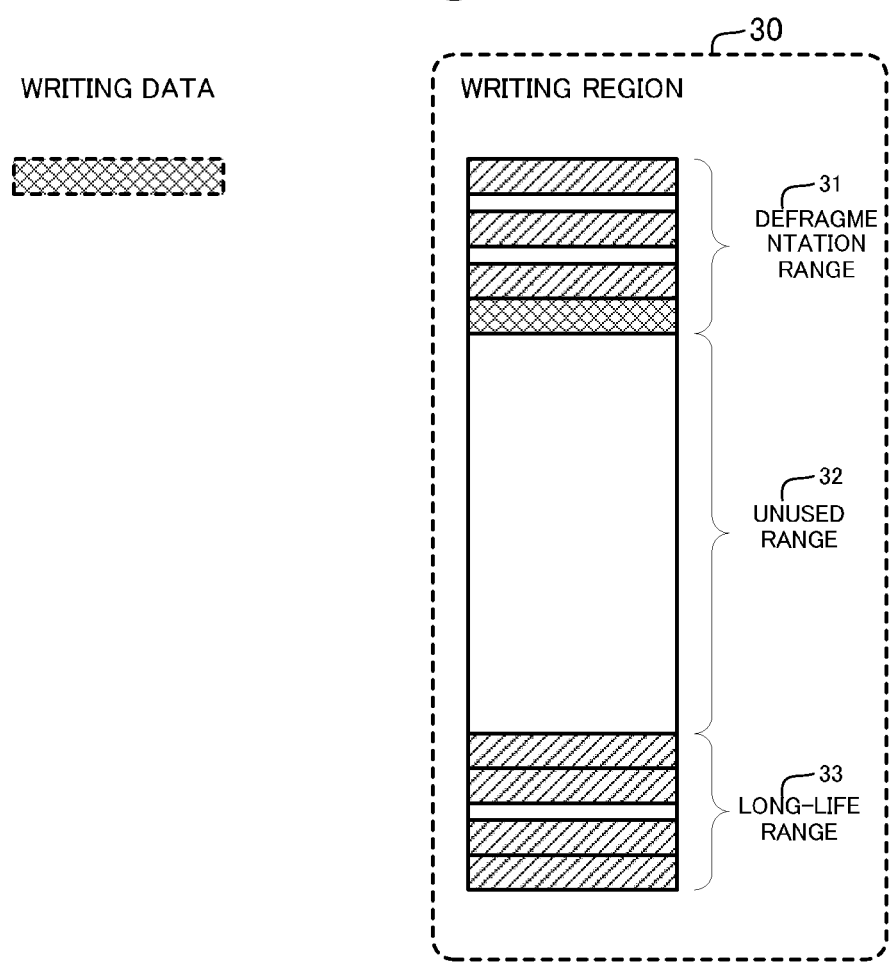
FIG. 9 is an explanation diagram for explaining the aspect of the data writing process in the storage system disclosed in FIG. 3.

After that, as shown in FIG. 9, the writing part 11 increases the defragmentation range 31 from the ending thereof by the size of the written block data to decrease the unused range 32 from the beginning thereof by the size of the written block data. In other words, the writing part 11 sets a range in which a range (a cross-hatching portion in FIG. 9) storing block data continuously from the site adjacent to the defragmentation range 31 located at the beginning in the unused range 32 and the defragmentation range (reference numeral 31 in FIG. 8) are connected, as a new defragmentation range (reference numeral 31 in FIG. 9). Then, the writing part 11 updates the last writing time in the writing region 30 in the region management table 15.

In addition, the writing part 11 adds a new entry to the block management table 16, and stores the region number of the region where the block data is written in, a physical address, and the size of the block data. The writing part 11 finally adds the hash value of the written block data to the list of the corresponding file in the file management table 17.

Next, an operation by the retrieving part 12 will be described. Upon reception of a request to retrieve a file, the retrieving part 12 refers to the file management table 17 to retrieve and enumerate hash values of respective block data configuring the file. Then, the retrieving part 12 refers to the block management table 16, finds regions and physical address where the block data are stored, retrieves the block data from the storage locations, and restores the file. Thus, the requested file is retrieved.

Next, an operation by the deleting part 13 will be described. Upon reception of a request to delete a file, the deleting part 13 decrements a duplication rate in an entry in the block management table 16 corresponding to block data to be deleted. When a duplication rate is decremented to 0, the deleting part 13 deletes the corresponding entry from the block management table 16. However, a duplication rate does not need to be decremented instantly at the time of deletion, and may be decremented at proper timing after data deletion.

Figure 10:
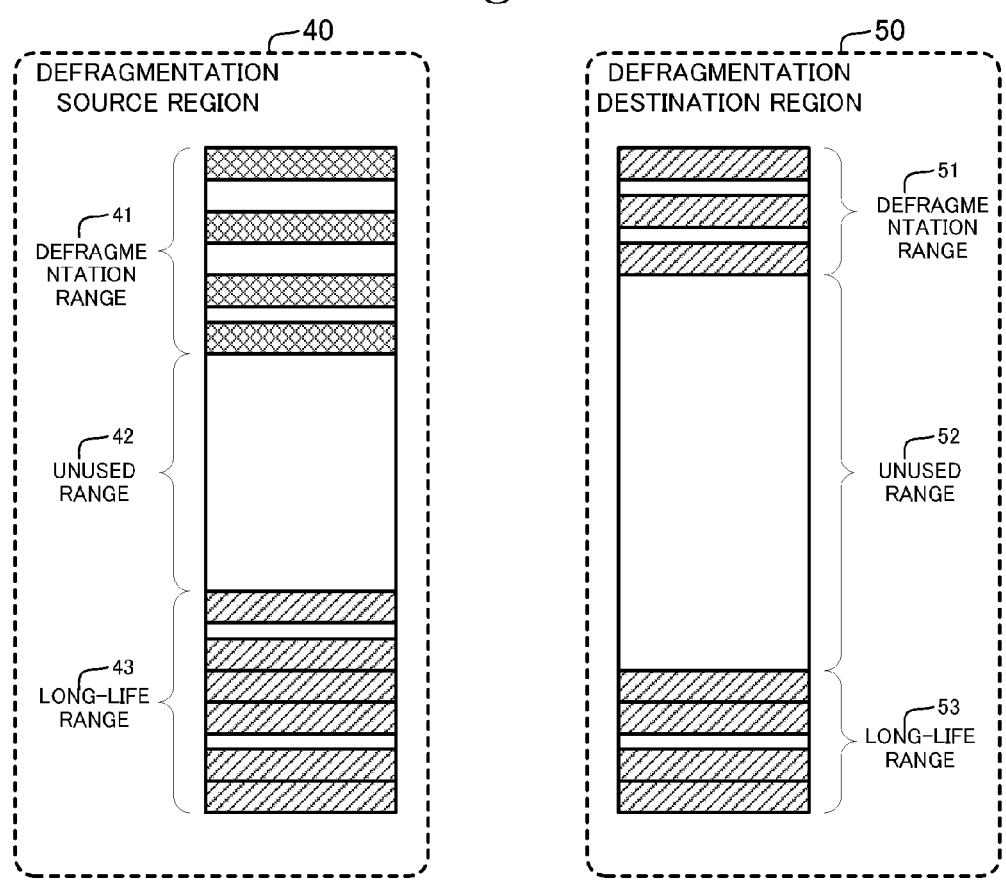
FIG. 10 is an explanation diagram for explaining an aspect of a defragmentation process in the storage system disclosed in FIG. 3.
Figure 11:
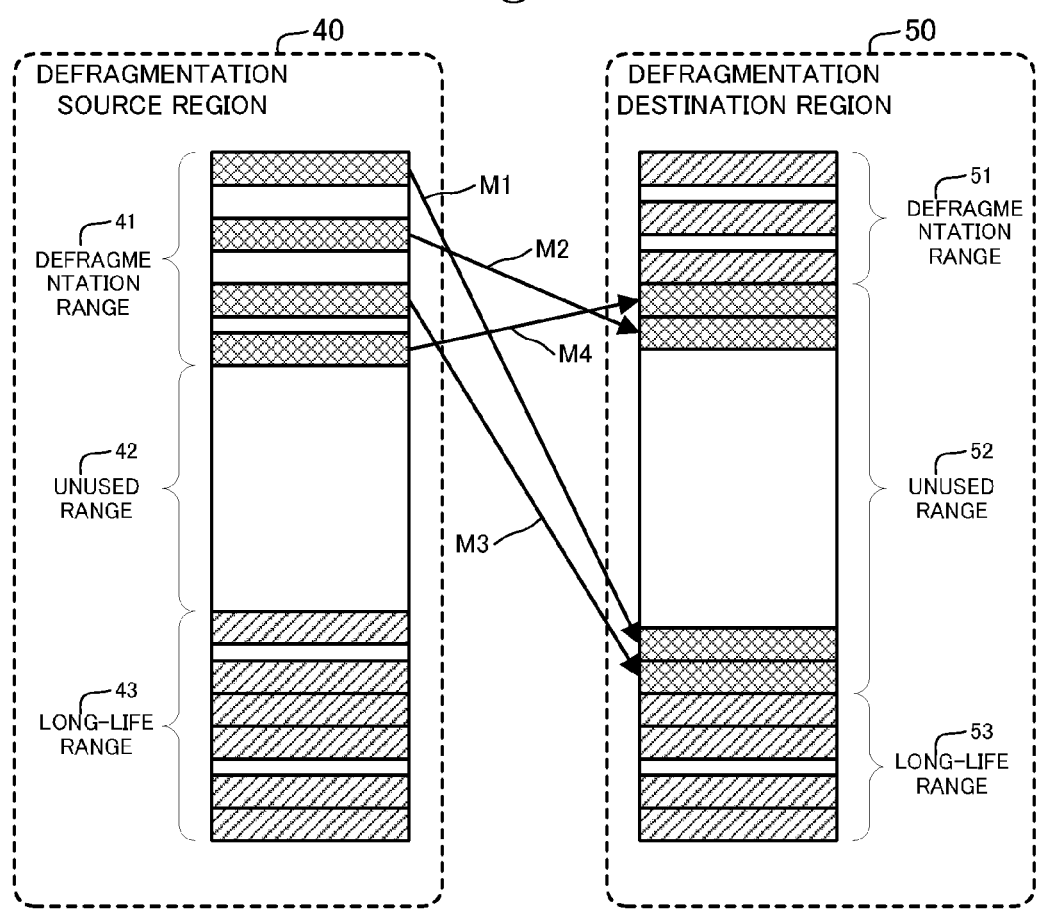
FIG. 11 is an explanation diagram for explaining the aspect of the defragmentation process in the storage system disclosed in FIG. 3.

Next, referring to FIGS. 10 to 13 and a flowchart shown in FIG. 15, an operation in defragmentation by the defragmenting part 14 will be described. In a case where the unused range of the region 21 with the in-use flag being "yes" has no space or the unused range becomes smaller than a predetermined value after data are written in, the defragmenting part 14 executes defragmentation. In defragmentation, two regions are used. In this instance, as shown in FIG. 13, the defragmenting part 14 uses the region management table 15 to select a region with the oldest last writing time from among regions whose defragmentation ranges are not vacant, or a region where data in the defragmentation range is less than a predetermined standard, as a region 21 to become a defragmentation source. Moreover, the defragmenting part 14 selects, as a region 21 to become a defragmentation destination, a region where the defragmentation range has no data (0 to 0). Herein, it is assumed that, as shown in FIG. 10, the defragmenting part 14 selects a defragmentation source region 40 (a region 2 in FIG. 13) as the region 21 to become the defragmentation source and a defragmentation destination region 50 (a region 1 in FIG. 13) as the region 21 to become the defragmentation destination. Then, the defragmenting part 14 executes defragmentation by moving block data from the defragmentation source region 40 to the defragmentation destination region 50. A defragmentation source region and a defragmentation destination region can be selected by any standard.

The defragmentation source region 40 and the defragmentation destination region 50 are regions set so that defragmentation ranges 41 and 51, unused ranges 42 and 52, and long-life ranges 43 and 53, each of which has a predetermined capacity, lie in this order, respectively. That is to say, the unused ranges 42, 52 are sandwiched between the defragmentation ranges 41, 51 and the long-life ranges 43, 53, respectively. The defragmentation ranges 41, 51 are adjacent to the beginnings (one ends) of the unused ranges 42, 52, respectively. The long-life ranges 43, 53 are adjacent to the endings (the other ends) of the unused ranges 42, 52, respectively.

First, the defragmenting part 14 enumerates block data included in the defragmentation range 41 of the defragmentation source region 40 (step S11). Next, for each of the block data, the defragmenting part 14 refers to the block management table 16 to check the duplication rate of the block data (step S12).

In a case where the duplication rate of the block data is less than a given value (step S13: Yes), the defragmenting part 14 moves the block data to the beginning of the unused region 52 in the defragmentation destination region 50 as shown by arrows M2 and M4 in FIG. 11 (step S14). That is to say, the defragmenting part 14 writes in the block data at a site adjacent to the defragmentation range 51 in the unused range 52 of the defragmentation destination region 50 (refer to a cross-hatching portion in FIG. 11). In a case where other block data is already stored at the site adjacent to the defragmentation range 51 in the unused range 52, the defragmenting part 14 writes in the block data at a site where data is located continuously from the defragmentation range 51.

Figure 12:
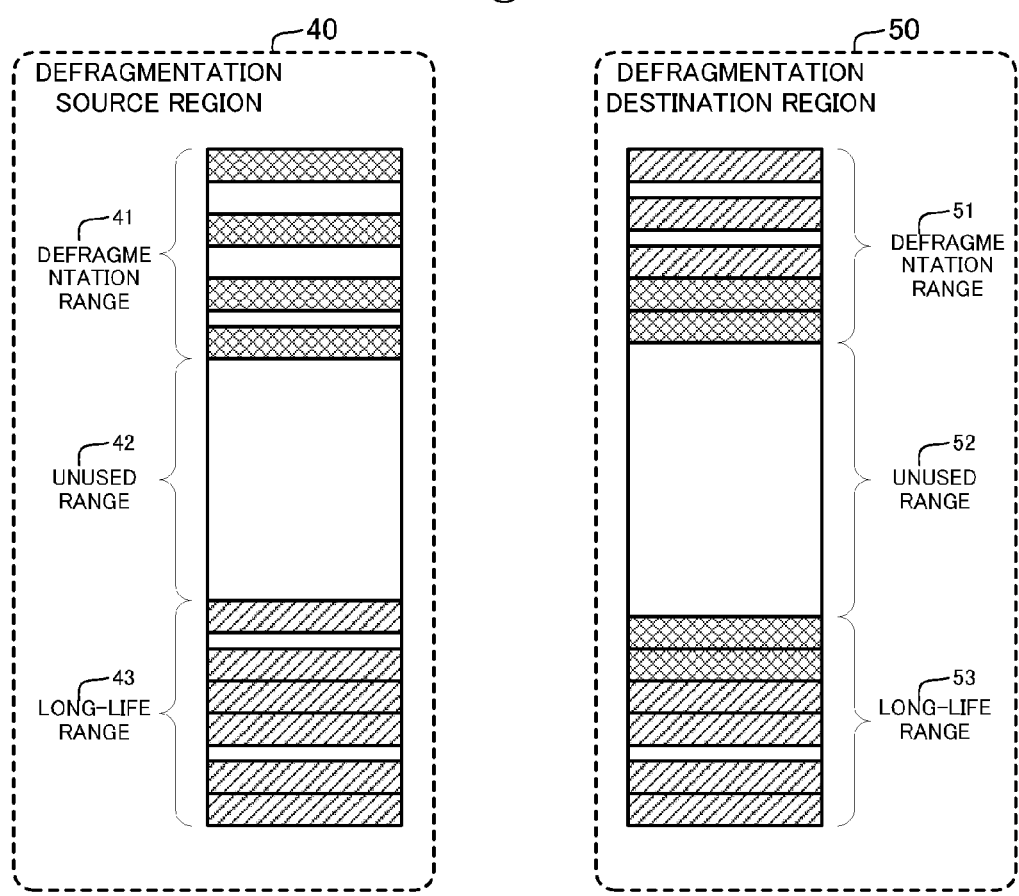
FIG. 12 is an explanation diagram for explaining the aspect of the defragmentation process in the storage system disclosed in FIG. 3.

After that, as shown in FIG. 12, the defragmenting part 14 increases the defragmentation range 51 from the ending by the size of the written block data and also decreases the unused range 52 from the beginning by the size of the written block data in the defragmentation destination region 50. In other words, the defragmenting part 14 sets a range where a portion (a cross-hatching portion in FIG. 11) storing block data continuously from a site adjacent to the defragmentation range 51 located at the beginning of the unused range 52 and the defragmentation range (reference numeral 51 in FIG. 11) are connected, as a new defragmentation range (reference numeral 51 in FIG. 12). The new defragmentation range 51 in the defragmentation destination region 50 becomes a defragmentation target later. Then, the defragmenting part 14 updates the last writing time of the defragmentation destination region 50 in the region management table 15.

Further, in a case where the duplication rate of the block data is equal to or more than the given value (step S13: No), the defragmenting part 14 moves the block data to the ending of the unused region 52 in the defragmentation destination region 50 as shown by arrows M1 and M3 in FIG. 11 (step S15). That is to say, the defragmenting part 14 writes in the block data at a site adjacent to the long-life range 53 in the unused range 52 of the defragmentation destination region 50 (refer to the cross-hatching portion in FIG. 11). In a case where other block data is already stored at the site adjacent to the long-life range 53 in the unused range 52, the defragmenting part 14 writes in the block data at a site where data is located continuously from the long-life range 53.

After that, as shown in FIG. 12, the defragmenting part 14 increases the long-life range 53 from the beginning by the size of the written block data and also decreases the unused range 52 from the ending by the size of the written block data in the defragmentation destination region 50. In other words, the defragmenting part 14 sets a range where a portion (the cross-hatching portion in FIG. 11) storing block data continuously from a site adjacent to the long-life range 53 located at the ending of the unused range 52 and the long-life range (reference numeral 53 in FIG. 11) are connected, as a new long-life range (reference numeral 53 in FIG. 12).

In a case where the duplication rate of the block data in the defragmentation range 41 of the defragmentation source region 40 is decremented to "0" by defragmentation described above, the defragmenting part 14 deletes the corresponding line in the block management table 16 to discard the block data. In a case where the unused range 52 of the defragmentation destination region 50 has no space or the unused range 52 becomes smaller than a predetermined value at this moment, the defragmenting part 14 stops defragmentation. Moreover, the defragmenting part 14 updates a line having the corresponding hash value in the block management table 16 so that the region number and the physical address indicate the destination where the data is moved. At a point that all of these processes are completed, the defragmenting part 14 integrates the defragmentation range 41 of the defragmentation source region 40 into the unused range 42, and sets the defragmentation range 41 to "0-0."

After defragmentation, the defragmenting part 14 or the writing part 11 changes the in-use flag of the defragmentation destination region 50 to "yes," and sets the in-use flags of all of the other regions 21 to "no."

As described above, in the storage system in this exemplary embodiment, block data with high duplication rates and block data with low duplication rates are stored at different places (a defragmentation range and a long-life range) at the time of defragmentation. Thus, at the time of next defragmentation, the long-life range storing the block data with high duplication rates is excluded from the target of defragmentation, and only the defragmentation range storing the block data with low duplication rates is set as the defragmentation target. Consequently, it is possible to reduce I/O load required for defragmentation as compared with a case of defragmenting the entire region 21.

Further, at the time of writing in data, an in-use flag in the region management table 15 is used to limit a writable region. Thus, data will not be written into another region where any data cannot be written, and only deletion of block data is executed there. Consequently, it can be expected that a region where data is not written changes to an empty region as time goes by.

Furthermore, it can be expected that most of data with low duplication rates are deleted as time goes by and the corresponding range changes to a continuing empty region. Therefore, it is possible to store data with low duplication rates together in one area and utilize the area as an empty region after a while. On the other hand, it is less probable that data with high duplication rates are deleted later. Therefore, it is possible to store the data together in one area and suppress occurrence of fragmentation of an empty region.

<Second Exemplary Embodiment>

Figure 17:
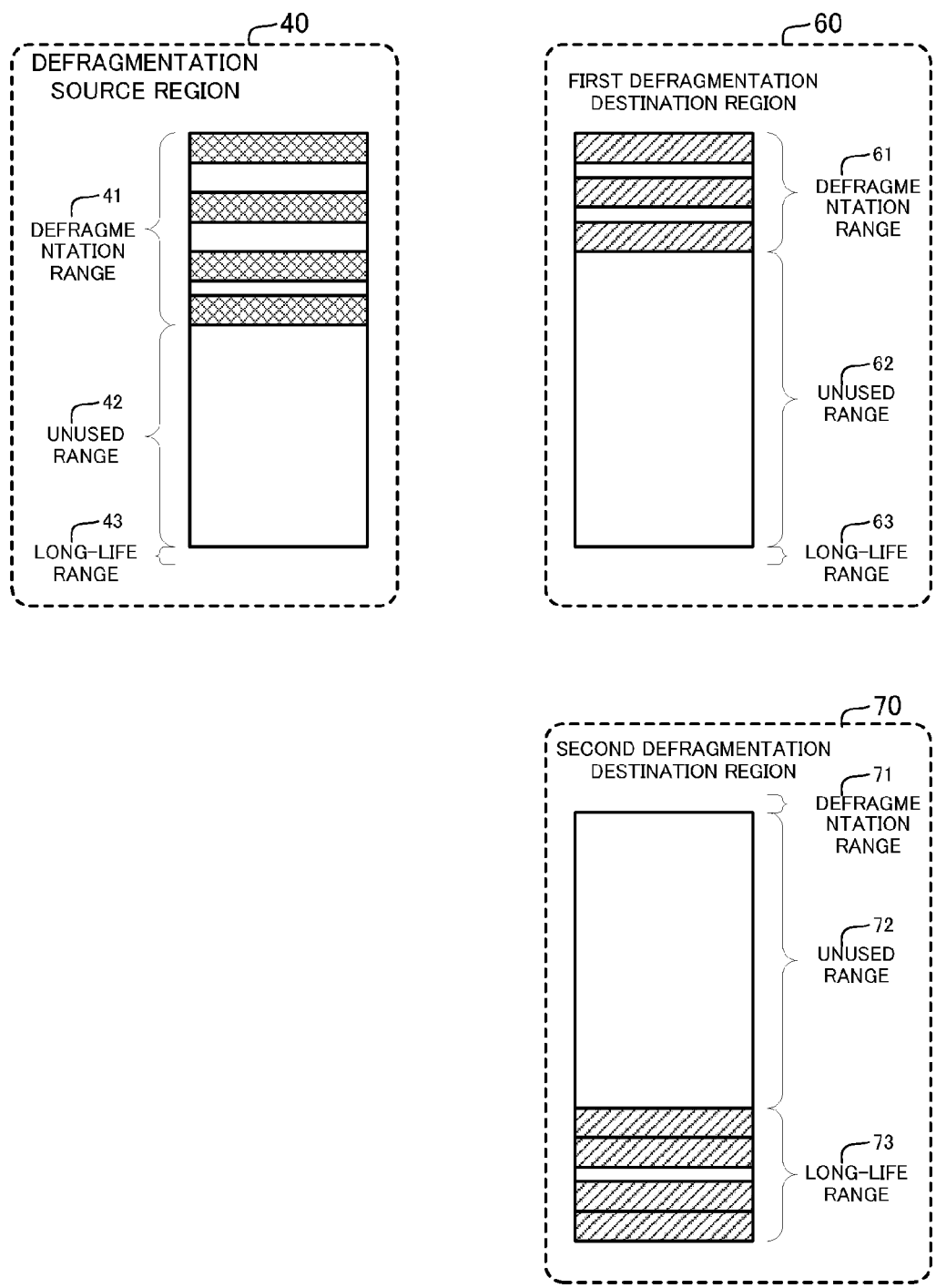
FIG. 17 is an explanation diagram for explaining an aspect of a defragmentation process in the storage system in the second exemplary embodiment.
Figure 18:
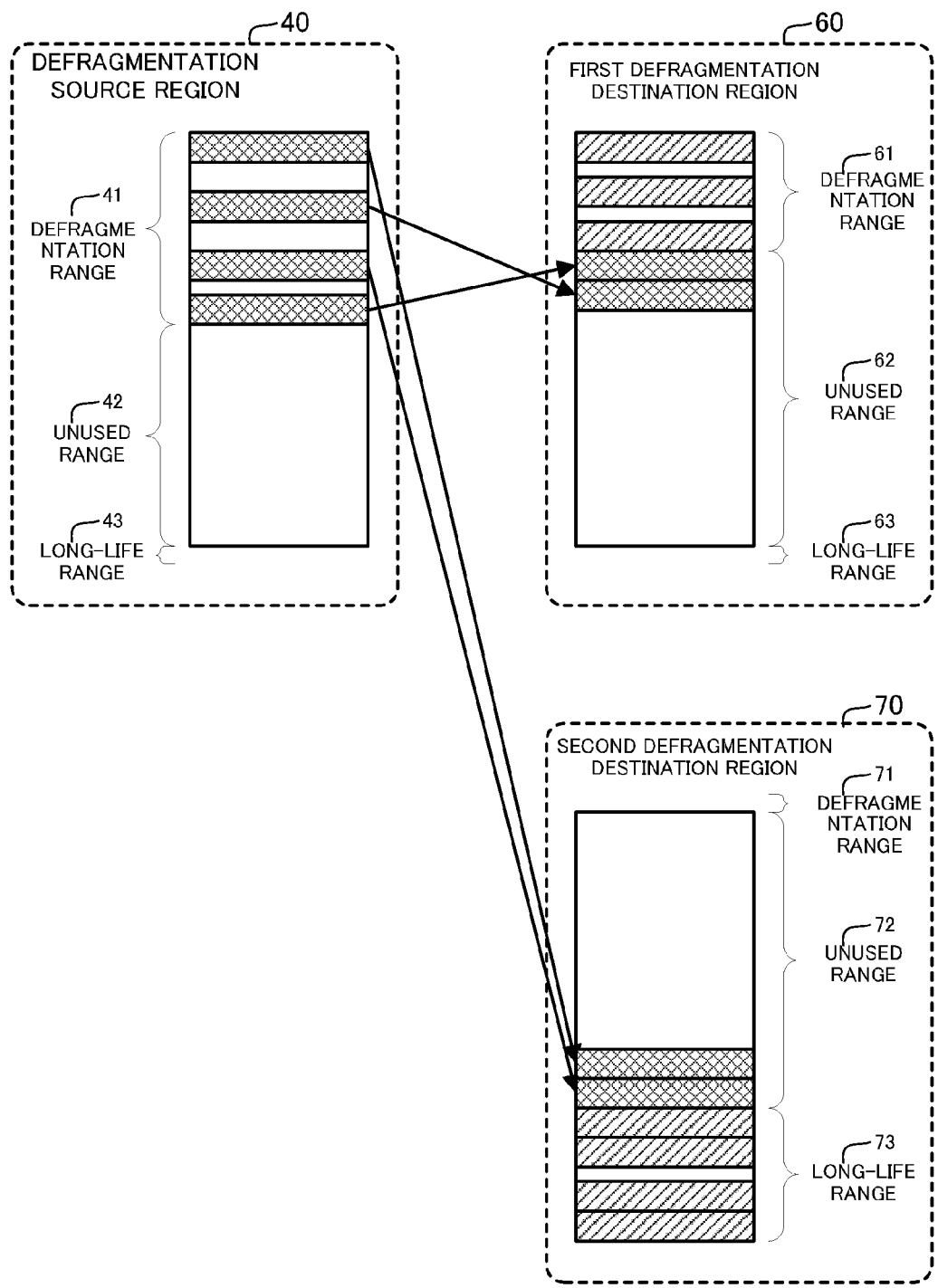
FIG. 18 is an explanation diagram for explaining the aspect of the defragmentation process in the storage system in the second exemplary embodiment.
Figure 19:
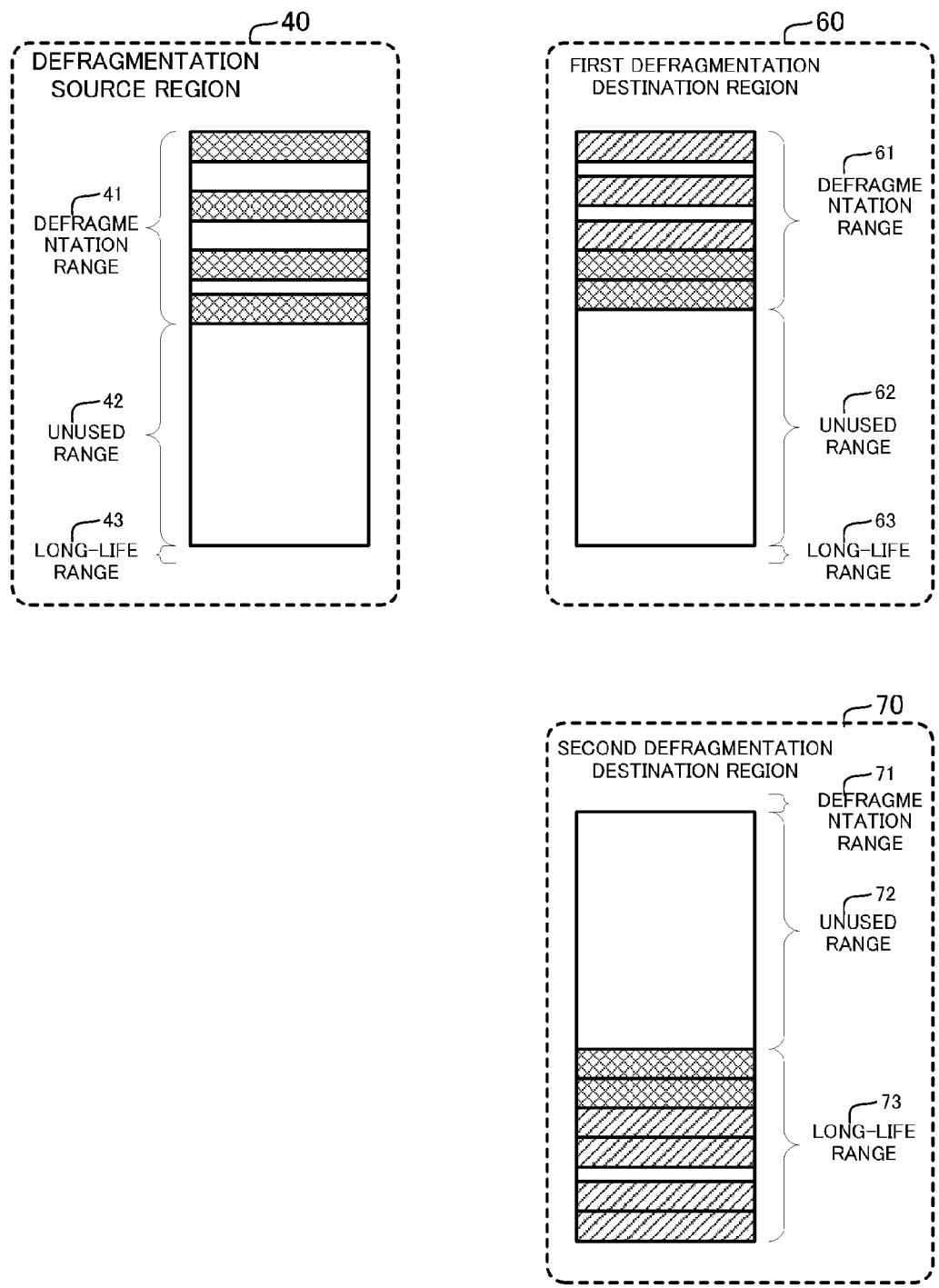
FIG. 19 is an explanation diagram for explaining the aspect of the defragmentation process in the storage system in the second exemplary embodiment.
Figure 20:
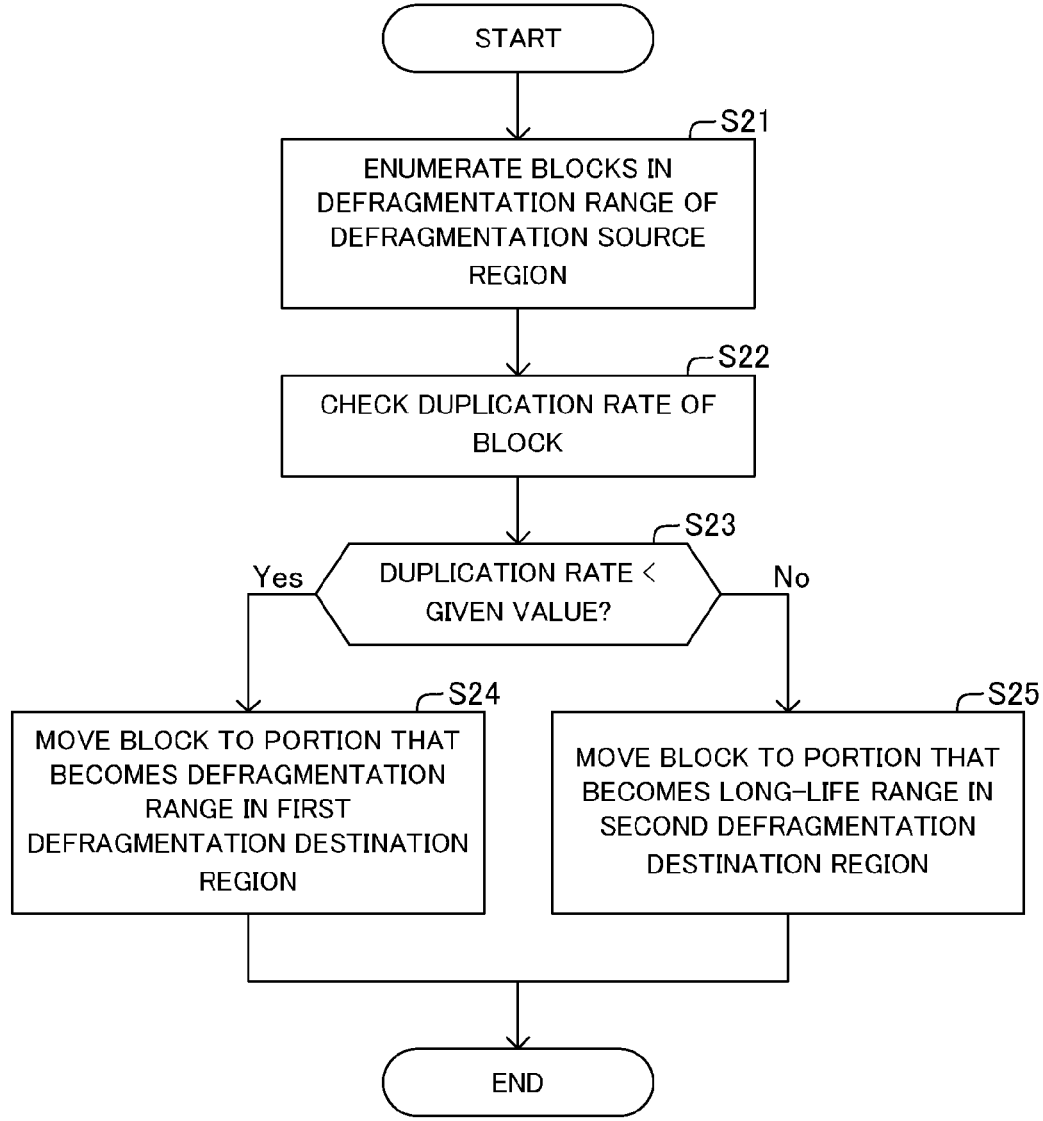
FIG. 20 is a flowchart showing an operation of the defragmentation process in the storage system in the second exemplary embodiment.

Next, referring to FIGS. 16 to 20, a second exemplary embodiment of the present invention will be described. FIG. 16 is a diagram showing an example of the region management table. FIGS. 17 to 19 are explanation diagrams for describing an operation in defragmentation by the storage system. FIG. 20 is a flowchart showing an operation by the storage system.

The storage system in this exemplary embodiment has almost the same configuration as in the first exemplary embodiment described above, but the configuration of the defragmentation destination region storing block data at the time of defragmentation is different. The different configuration from that of the first exemplary embodiment will be chiefly described below.

First, the regions 21 within the storage device 20 in this exemplary embodiment are made to be dedicated regions, such as "short-life region" chiefly storing block data with low duplication rates and "long-life region" chiefly storing block data with high duplication rates as shown in the region management table 15 of FIG. 16.

As shown in FIG. 17, "short-life region" is selected as a first defragmentation destination region 60 (a first region) at the time of defragmentation. This first defragmentation destination region 60 as "short-life region" is a region in which a defragmentation range 61, an unused range 62 and a long-life range 63 having predetermined capacities, respectively, are set consecutively in this order. That is to say, the unused range 62 is sandwiched between the defragmentation range 61 and the long-life range 63, the defragmentation range 61 is adjacent to the beginning (one end) of the unused range 62, and the long-life range 63 is adjacent to the ending (the other end) of the unused range 62.

Further, as shown in FIG. 17, "long-life region" is selected as a second defragmentation destination region 70 (a second region) at the time of defragmentation. This second defragmentation destination region 70 as "long-life region" is a region in which a defragmentation range 71, an unused range 72 and a long-life range 73 having predetermined capacities, respectively, are set consecutively in this order. That is to say, the unused range 72 is sandwiched between the defragmentation range 71 and the long-life range 73, the defragmentation range 71 is adjacent to the beginning (one end) of the unused range 72, and the long-life range 73 is adjacent to the ending (the other end) of the unused range 72.

Next, an operation in defragmentation will be described. First, from the region management table 15 shown in FIG. 16, a region with the oldest last writing time is selected as the defragmentation source region 40 to become a defragmentation source, from among regions in which defragmentation ranges are not empty. Further, as the defragmentation destination regions 60 and 70 to become defragmentation destinations, two kinds of regions, one of which is for short life and the other of which is for long life, are selected. As the first defragmentation region 60 for short life, a region with the largest unused range is selected from among regions whose characteristics are short-life. As the second defragmentation destination region 70 for long life, a region with an empty defragmentation range is selected from among regions whose characteristics are long-life. Herein, it is assumed that the first defragmentation region 60 for short life and the second defragmentation region 70 for long life are selected as shown in FIG. 17. Then, defragmentation is executed by moving block data from the defragmentation source region 40 to the first defragmentation destination region 60 and the second defragmentation destination region 70.

First, the defragmenting part 14 enumerates block data contained in the defragmentation range 41 of the defragmentation source region 40 (step S21). Next, with respect to each of the block data, the defragmenting part 14 refers to the block management table 16 and checks the duplication rate of the block data (step S22).

In a case where the duplication rate of the block data is less than a given value (step S23: Yes), the defragmenting part 14 moves the block data to the beginning of the unused range 62 in the first defragmentation destination region 60 as shown in FIG. 18 (step S24). That is to say, the defragmenting part 14 writes in the block data at a site adjacent to the defragmentation range 61 in the unused range 62 of the defragmentation destination region 60 (refer to a cross-hatching portion in FIG. 18).

After that, as shown in FIG. 19, the defragmenting part 14 increases the defragmentation range 61 from the ending by the size of the written block data and also decreases the unused range 62 from the beginning by the size of the written block data in the first defragmentation destination region 60. In other words, the defragmenting part 14 sets a range in which a portion (the cross-hatching portion in FIG. 18) storing block data continuously from the site adjacent to the defragmentation range 61 located at the beginning of the unused range 62 and the defragmentation range (reference numeral 61 in FIG. 18) are connected, as a new defragmentation range (reference numeral 61 in FIG. 19). Consequently, the new defragmentation range 61 of the first defragmentation destination region 60 becomes the target of defragmentation later. Then, the defragmenting part 14 updates the last writing time of the first defragmentation destination range 60 in the region management table 15.

Further, in a case where the duplication rate of the block data is equal to or more than the given value (step S23: No), the defragmenting part 14 moves the block data to the ending of the unused region 72 in the second defragmentation destination region 70 as shown in FIG. 18 (step S24). That is to say, the defragmenting part 14 writes in the block data at a site adjacent to the long-life range 73 in the unused range 72 of the second defragmentation destination region 70 (refer to a cross-hatching portion in FIG. 18).

After that, as shown in FIG. 19, the defragmenting part 14 increases the long-life range 73 from the beginning by the size of the written block data and also decreases the unused range 72 from the ending by the size of the written block data in the second defragmentation destination region 70. In other words, the defragmenting part 14 sets a range in which a portion (a cross-hatching portion in FIG. 18) storing block data consecutive from the site adjacent to the long-life range 73 located at the ending of the unused range 72 and the long-life range (reference numeral 73 in FIG. 18) are connected, as a new long-life range (reference numeral 73 in FIG. 19).

When the duplication rate of block data within the defragmentation range 41 in the defragmentation source region 40 is decremented to "0" by defragmentation described above, the defragmenting part 14 deletes the corresponding line in the block management table 16 to discard the block data. At this moment, the defragmenting part 14 stops defragmentation in a case where the unused range 62 in the defragmentation destination region 60 has no space or the unused range 62 becomes smaller than a predetermined value, and selects another region whose characteristic is long-life again and continues defragmentation in a case where the unused range 72 in the defragmentation destination region 70 has no space or the unused range 72 becomes smaller than a predetermined value. Moreover, the defragmenting part 14 updates a line with the corresponding hash value in the block management table 16 so that the region number and the physical address indicate the destination where the data are moved. At a point that all of these processes are completed, the defragmenting part 14 integrates the defragmentation range 41 of the defragmentation source region 40 into the unused range 42, and sets the defragmentation range 41 to "0-0."

After defragmentation, the defragmenting part 14 or the writing part 11 changes the in-use flag of the first defragmentation destination region 60 to "yes" and sets the in-use flags of all of the other regions 21 to "no."

As described above, by setting dedicated regions such as "short-life region" and "long-life region" as defragmentation destinations for storing block data depending on the duplication rates, it becomes easy to secure a defragmentation destination region at the time of defragmentation, and it becomes simple to implement a means for executing defragmentation.

Figure 21:
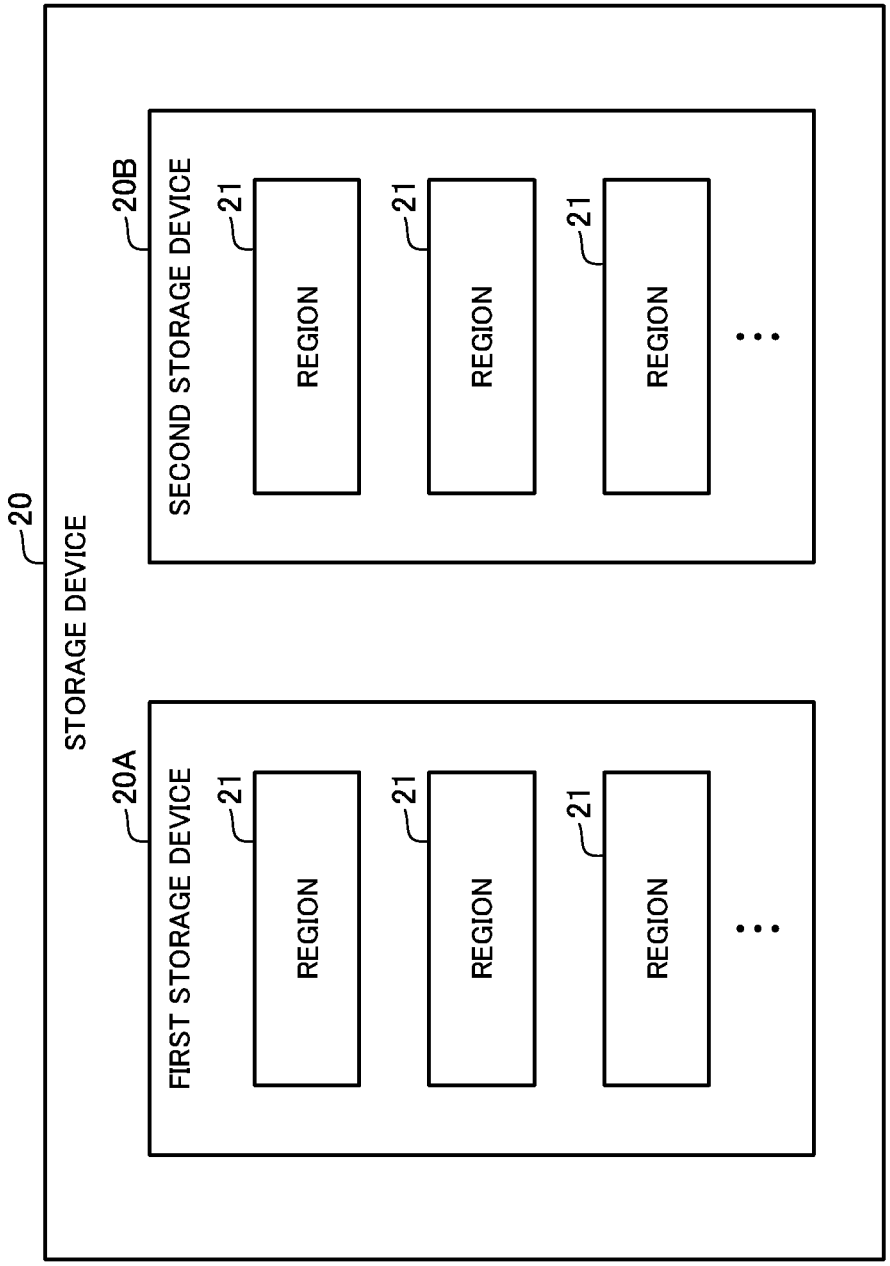
FIG. 21 is a block diagram showing another configuration of the storage system in the second exemplary embodiment.

As the storage device 20, two kinds of devices whose data access speeds, specifically, retrieval speeds are different may be used. For example, as shown in FIG. 21, the storage device 20 includes a first storage device 20A such as a hard disk drive, and a second storage device 20B such as an SSD (Solid State Drive) whose data access speed is higher than that of the first storage device 20A. Then, the region 21 within the first storage device 20A is used as the first defragmentation destination region 60 storing block data with low duplication rates chiefly, and the region 21 within the second storage device 20B is used as the second defragmentation destination region 70 storing block data with high duplication rates chiefly.

Consequently, although block data with high duplication rates are referred to with high frequency, the second defragmentation destination region 70 where such block data are consolidated by defragmentation is formed in the second storage device 20B whose retrieval speed is high, whereby it is possible to increase the retrieval performance.

<Supplementary Notes>

Figure 22:
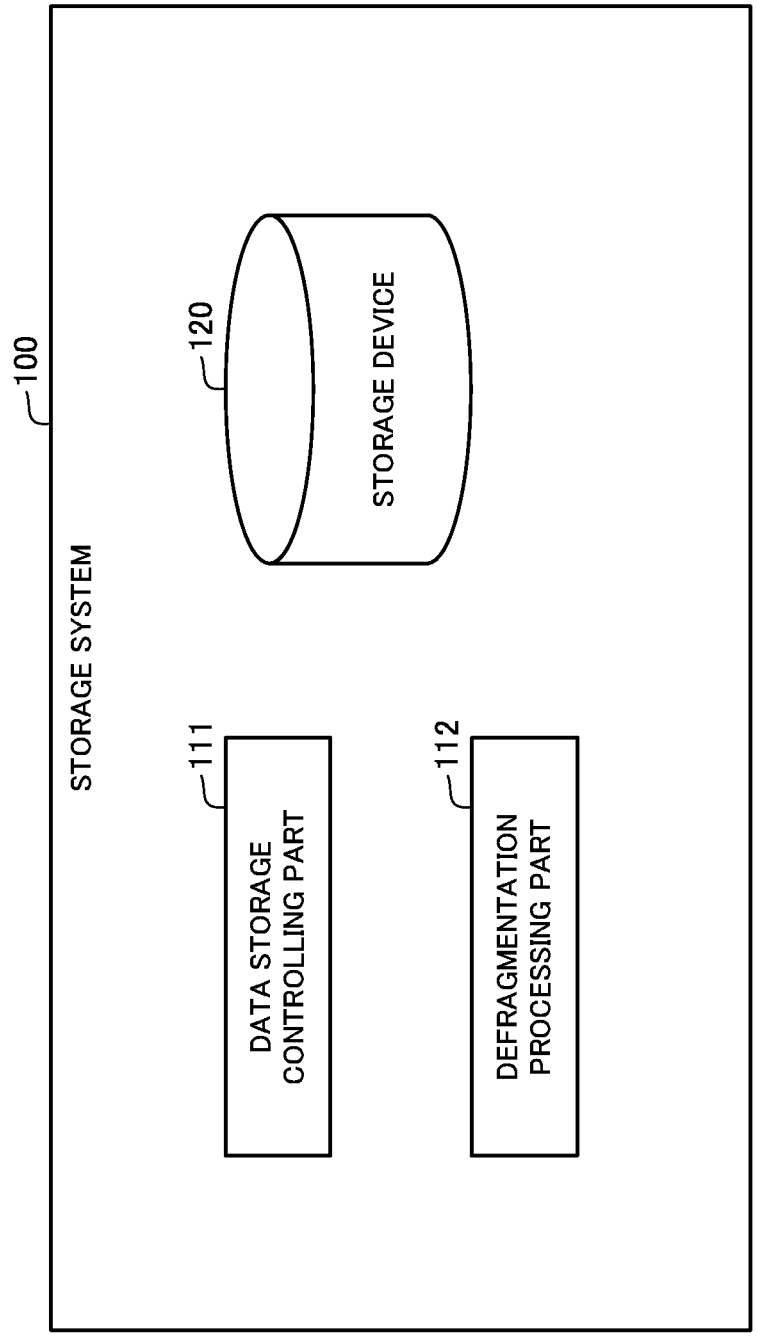
FIG. 22 is a block diagram showing a configuration of a storage system in Supplementary Note 1 of the present invention.

The whole or part of the exemplary embodiments disclosed above can also be described as in the following Supplementary Notes. The outline of configurations of a storage system (refer to FIG. 22), a program, and a defragmentation method according to the present invention will be described below. However, the present invention is not limited by the following configurations.

(Supplementary Note 1)

A storage system 100 including:

a data storage controlling part 111 configured to store storage target data into a storage device 120 and, when storing other storage target data of an identical data content to the storage target data already stored in the storage device into the storage device, refer to the storage target data already stored in the storage device as the other storage target data; and a defragmentation processing part 112 configured to move and store the storage target data stored in an area set as a defragmentation range within a predetermined region of the storage device, into another region of the storage device, wherein:

the data storage controlling part 111 is configured to, for each of the storage target data stored in the storage device, store reference frequency that is frequency of referring to the storage target data as the other storage target data; and the defragmentation processing part 112 is configured to, depending on the reference frequency of the storage target data, store the storage target data into an area to become a defragmentation range later within another region of the storage device.

(Supplementary Note 2)

The storage system according to Supplementary Note 1, wherein the defragmentation processing part is configured to store the storage target data whose reference frequency is less than a preset threshold into an area to become a defragmentation range later within another region of the storage device, and store the storage target data whose reference frequency is equal to or more than the preset threshold into an area to become a non-defragmentation range later within another region of the storage device.

(Supplementary Note 3)

The storage system according to Supplementary Note 2, wherein:

in another region of the storage device, a preset defragmentation range and an unused range that is a range where no data is stored are formed adjacent to each other; and the defragmentation processing part is configured to store the storage target data whose reference frequency is less than a threshold in a site within the unused range in the other region of the storage device, the site being a site where data is located continuously from a site adjacent to the defragmentation range, and set a range formed by connecting a range where the storage target data is stored continuously from the site adjacent to the defragmentation range within the unused range with the defragmentation range, as a new defragmentation range.

(Supplementary Note 4)

The storage system according to Supplementary Note 3, wherein:

in another region of the storage device, a preset non-defragmentation range and an unused range that is a range where no data is stored are formed adjacent to each other; and the defragmentation processing part is configured to store the storage target data whose reference frequency is equal to or more than a threshold in a site within the unused range in the other region of the storage device, the site being a site where data is located continuously from a site adjacent to the non-defragmentation range, and set a range formed by connecting a range where the storage target data is stored continuously from the site adjacent to the non-defragmentation range within the unused range with the non-defragmentation range, as a new non-defragmentation range.

(Supplementary Note 5)

5. The storage system according to Supplementary Note 2, wherein:

in another region of the storage device, one end of an unused range that is a range where no data is stored is adjacent to a preset defragmentation range, other end of the unused range is adjacent to a preset non-defragmentation range, and the unused range is formed between the defragmentation range and the non-defragmentation range; and the defragmentation processing part is configured to: store the storage target data whose reference frequency is less than a threshold in a site within the unused range in the other region of the storage device, the site being a site where data is located continuously from a site adjacent to the defragmentation range, and set a range formed by connecting a range where the storage target data is stored continuously from the site adjacent to the defragmentation range within the unused range with the defragmentation range, as a new defragmentation range; and store the storage target data whose reference frequency is equal to or more than the threshold in a site within the unused range in the other region of the storage device, the site being a site where data is located continuously from a site adjacent to the non-defragmentation range, and set a range formed by connecting a range where the storage target data is stored continuously from the site adjacent to the non-defragmentation range within the unused range with the non-defragmentation range, as a new non-defragmentation range.

(Supplementary Note 6)

The storage system according to any of Supplementary Notes 1 to 5, wherein:

in a predetermined region of the storage device, a preset defragmentation range and an unused range that is a range where no data is stored are formed adjacent to each other; and the data storage controlling part is configured to, when newly storing the storage target data into the storage device, store in a site within the unused range in the predetermined region of the storage device, the site being a site where data is located continuously from a site adjacent to the defragmentation range, and set a range formed by connecting a range where the storage target data is stored continuously from the site adjacent to the defragmentation range within the unused range with the defragmentation range, as a new defragmentation range.

(Supplementary Note 7)

The storage system according to Supplementary Note 4, wherein another region of the storage device has a first region in which the defragmentation range and the unused range are formed adjacent to each other, and a second region which is different from the first region and in which the non-defragmentation range and the unused range are formed adjacent to each other.

(Supplementary Note 8)

The storage system according to Supplementary Note 7, wherein:

the first region is formed in a predetermined storage device; and the second region is formed in another storage device whose speed of data retrieval processing is higher than that of the predetermined storage device.

(Supplementary Note 9)

A non-transitory computer-readable medium storing a program comprising instructions for causing an information processing device to realize:

a data storage controlling part configured to store storage target data into a storage device and, when storing other storage target data of an identical data content to the storage target data already stored in the storage device into the storage device, refer to the storage target data already stored in the storage device as the other storage target data; and a defragmentation processing part configured to move and store the storage target data stored in an area set as a defragmentation range within a predetermined region of the storage device, into another region of the storage device, the program also comprising instructions for causing an information processing device to perform operations including:

by the data storage controlling part, for each of the storage target data stored in the storage device, storing reference frequency that is frequency of referring to the storage target data as the other storage target data; and by the defragmentation processing part, depending on the reference frequency of the storage target data, storing the storage target data into an area to become a defragmentation range later within another region of the storage device.

(Supplementary Note 9-2)

The non-transitory computer-readable medium storing the program according to Supplementary Note 9, wherein the defragmentation processing part is configured to store the storage target data whose reference frequency is less than a preset threshold into an area to become a defragmentation range later within another region of the storage device, and store the storage target data whose reference frequency is equal to or more than the preset threshold into an area to become a non-defragmentation range later within another region of the storage device.

(Supplementary Note 10)

A defragmentation method comprising:

performing data storage control by storing storage target data into a storage device and, when storing other storage target data of an identical data content to the storage target data already stored in the storage device into the storage device, referring to the storage target data already stored in the storage device as the other storage target data; and, for each of the storage target data stored in the storage device, storing reference frequency that is frequency of referring to the storage target data as the other storage target data;

executing a defragmentation process that is moving and storing the storage target data stored in an area set as a defragmentation range within a predetermined region of the storage device, into another region of the storage device; and in the defragmentation process, depending on the reference frequency of the storage target data, storing the storage target data into an area to become a defragmentation range later within another region of the storage device.

(Supplementary Note 10-2)

The defragmentation method according to Supplementary Note 10, further comprising, in the defragmentation process, storing the storage target data whose reference frequency is less than a preset threshold into an area to become a defragmentation range later within another region of the storage device, and storing the storage target data whose reference frequency is equal to or more than the preset threshold into an area to become a non-defragmentation range later within another region of the storage device.

The abovementioned program is stored in a storage device or recorded on a computer-readable recording medium. For example, the recording medium is a portable medium such as a flexible disk, an optical disk, a magneto-optical disk and a semiconductor memory.

Although the present invention has been described above by referring to the exemplary embodiments and so on, the present invention is not limited by the above exemplary embodiments. The configurations and details of the present invention can be modified in various manners that can be understood by one skilled in the art within the scope of the present invention.

The invention claimed is:

1. A storage system comprising:

a hardware processor;

a data storage controlling part implemented on the hardware processor, the data storage controlling part being configured to store storage target data into a storage device and, when storing other storage target data of an identical data content to the storage target data already stored in the storage device into the storage device, refer to the storage target data already stored in the storage device as the other storage target data; and a defragmentation processing part implemented on the hardware processor, the defragmentation processing part being configured to move and store the storage target data stored in an area set as a defragmentation range within a predetermined region of the storage device, into another region of the storage device, wherein:

the data storage controlling part is configured to, for each of the storage target data stored in the storage device, store reference frequency that is frequency of referring to the storage target data as the other storage target data; and the defragmentation processing part is configured to store the storage target data whose reference frequency is less than a preset threshold into an area to later become a defragmentation range within another region of the storage device, and store the storage target data whose reference frequency is equal to or more than the preset threshold into an area to later become a non-defragmentation range within another region of the storage device.

2. The storage system according to claim 1, wherein:

in another region of the storage device, a preset defragmentation range and an unused range that is a range where no data is stored are formed adjacent to each other; and the defragmentation processing part is configured to store the storage target data whose reference frequency is less than a threshold in a site within the unused range in the other region of the storage device, the site being a site where data is located continuously from a site adjacent to the defragmentation range, and set a range formed by connecting a range where the storage target data is stored continuously from the site adjacent to the defragmentation range within the unused range with the defragmentation range, as a new defragmentation range.

3. The storage system according to claim 2, wherein:
in another region of the storage device, a preset non-defragmentation range and an unused range that is a range where no data is stored are formed adjacent to each other; and
the defragmentation processing part is configured to store the storage target data whose reference frequency is equal to or more than a threshold in a site within the unused range in the other region of the storage device, the site being a site where data is located continuously from a site adjacent to the non-defragmentation range, and set a range formed by connecting a range where the storage target data is stored continuously from the site adjacent to the non-defragmentation range within the unused range with the non-defragmentation range, as a new non-defragmentation range.

4. The storage system according to claim 1, wherein:
in another region of the storage device, one end of an unused range that is a range where no data is stored is adjacent to a preset defragmentation range, other end of the unused range is adjacent to a preset non-defragmentation range, and the unused range is formed between the 5 defragmentation range and the non-defragmentation range; and
the defragmentation processing part is configured to: store the storage target data whose reference frequency is less than a threshold in a site within the unused range in the other region of the storage device, the site being a site where data is located continuously from a site adjacent to the defragmentation range, and set a range formed by connecting a range where the storage 10 target data is stored continuously from the site adjacent to the defragmentation range within the unused range with the defragmentation range, as a new defragmentation range; and store the storage target data whose reference frequency is equal to or more than the threshold in a site within the unused range in the other region of the storage device, the site being a site where data is located continuously from a site adjacent to the non-defragmentation range, and set a range 15 formed by connecting a range where the storage target data is stored continuously from the site adjacent to the non-defragmentation range within the unused range with the non-defragmentation range, as a new non-defragmentation range.

5. The storage system according to claim 1, wherein:
in a predetermined region of the storage device, a preset defragmentation range and an unused range that is a range where no data is stored are formed adjacent to each other; and
the data storage controlling part is configured to, when newly storing the storage target data into the storage device, store in a site within the unused range in the predetermined region of the storage device, the site being a site where data is located continuously from a site adjacent to the defragmentation range, and set a range formed by connecting a range where the storage target data is stored continuously from the site adjacent to the defragmentation range within the 5 unused range with the defragmentation range, as a new defragmentation range.

6. The storage system according to claim 3, wherein another region of the storage device has a first region in which the defragmentation range and the unused range are formed adjacent to each other, and a second region which is different from the first region and in which the nondefragmentation range and the unused range are formed adjacent to each other.

7. The storage system according to claim 6, wherein:
the first region is formed in a predetermined storage device; and
the second region is formed in another storage device whose speed of data retrieval processing is higher than that of the predetermined storage device.

8. A non-transitory computer-readable medium storing a program comprising instructions for causing an information processing device to realize:
a data storage controlling part configured to store storage target data into a storage device and, when storing other storage target data of an identical data content to the storage target data already stored in the storage device into the storage device, refer to the storage target data already stored in the storage device as the other storage target data; and
a defragmentation processing part configured to move and store the storage target data stored in an area set as a defragmentation range within a predetermined region of the storage device, into another region of the storage device,
the program also comprising instructions for causing an information processing device to perform operations including:
by the data storage controlling part, for each of the storage target data stored in the storage device, storing reference frequency that is frequency of referring to the storage target data as the other storage target data; and
by the defragmentation processing part is configured to store the storage target data whose reference frequency is less than a preset threshold into an area to later become a defragmentation range within another region of the storage device, and store the storage target data whose reference frequency is equal to or more than the preset threshold into an area to later become a non-defragmentation range within another region of the storage device.

9. A defragmentation method comprising:
performing, by a hardware processor, data storage control by storing storage target data into a storage device and, when storing other storage target data of an identical data content to the storage target data already stored in the storage device into the storage device, referring to the storage target data already stored in the storage device as the other storage target data; and, for each of the storage target data stored in the storage device, storing reference frequency that is frequency of referring to the storage target data as the other storage target data;
executing, by the hardware processor, a defragmentation process that is moving and storing the storage target data stored in an area set as a defragmentation range within a predetermined region of the storage device, into another region of the storage device; and
in the defragmentation process, storing the storage target data whose reference frequency is less than a preset threshold into an area to later become a defragmentation range within another region of the storage device, and storing the storage target data whose reference frequency is equal to or more than the preset threshold into an area to later become a non-defragmentation range within another region of the storage device.

* * * * *